US006188912B1

United States Patent
Struhsaker et al.

(10) Patent No.: US 6,188,912 B1
(45) Date of Patent: Feb. 13, 2001

(54) SYSTEM FOR A BASE STATION FOR PROVIDING VOICE, DATA, AND MULTIMEDIA SERVICES IN A WIRELESS LOCAL LOOP SYSTEM

(75) Inventors: Paul F. Struhsaker, Plano; Thomas C. Hudson, Allen, both of TX (US)

(73) Assignee: World Access, Inc., Atlanta, GA (US)

( * ) Notice: Under 35 U.S.C. 154(b), the term of this patent shall be extended for 0 days.

(21) Appl. No.: 09/092,349

(22) Filed: Jun. 5, 1998

(51) Int. Cl.[7] ........................................... H04B 1/38
(52) U.S. Cl. .................... 455/561; 455/507; 455/560; 455/5.1; 370/280
(58) Field of Search .................... 455/462, 507, 455/520, 524, 560, 561, 69, 452, 425, 522, 5, 5.1; 370/280, 281, 342, 343, 345

(56) References Cited

U.S. PATENT DOCUMENTS

| | | | |
|---|---|---|---|
| 5,166,925 | * 11/1992 | Ward | 370/250 |
| 5,239,673 | 8/1993 | Natarajan . | |
| 5,504,773 | 4/1996 | Padovani et al. . | |
| 5,511,067 | 4/1996 | Miller . | |
| 5,511,073 | 4/1996 | Padovani et al. . | |
| 5,544,223 | * 8/1996 | Robbins et al. | 455/426 |
| 5,555,258 | 9/1996 | Snelling et al. . | |
| 5,603,095 | 2/1997 | Uola . | |
| 5,689,511 | 11/1997 | Shimazaki et al. . | |
| 5,754,555 | * 5/1998 | Hurme et al. | 370/522 |
| 5,781,856 | * 7/1998 | Jacobs et al. | 455/403 |
| 5,802,177 | * 9/1998 | Daniel et al. | 455/403 |
| 5,812,651 | * 9/1998 | Kaplan | 379/200 |
| 5,821,987 | * 10/1998 | Larson | 379/93.17 |
| 5,953,675 | * 9/1999 | Rabina et al. | 455/557 |

OTHER PUBLICATIONS

Cook, 1994, "Development of Air Interface Standards for PCS," *IEEE Personal Communications Fourth Quarter*:30–34.

Rappaport, *Wireless Communications: Principles and Practice* Prentice Hall PTR, New Jersey, 1996, pp. 395–482.

Tanenbaum, *Computer News*, Third Edition. Prentice Hall PTR, New Jersey, pp. 479–576.

Yu et al., 1997, "Low–Tier Wireless Local Loop Radio Systems—Part 1: Introduction," *IEEE Communications Magazine Mar.* 1997:84–91.

Yu et al., 1997, "Low–Tier Wireless Local Loop Radio Systems—Part 2: Comparison of Systems," *IEEE Communications Magazine Mar.* 1997:94–98.

* cited by examiner

*Primary Examiner*—Edward F. Urban
*Assistant Examiner*—Congvan Tran
(74) *Attorney, Agent, or Firm*—Long, Aldridge & Norman LLP

(57) ABSTRACT

A base station architecture for a Wireless Local Loop (WLL). The architecture provides for use of the base station at the central office and remote location. The base station is designed to support POTS (Plain Old Telephone), ISDN, and direct data service in a point to multi-point configuration. The base station can further provide wired and/or wireless connections.

44 Claims, 22 Drawing Sheets

SYSTEM FOR A BASE STATION FOR PROVIDING VOICE, DATA, AND MULTIMEDIA SERVICES IN A WIRELESS LOCAL LOOP SYSTEM

CROSS REFERENCE TO RELATED APPLICATIONS

This application is related to application Ser. No. 09/085,263, entitled Method and System for an Air Interface For Providing Voice, Data, and Multimedia In a Wireless Local Loop System, filed on May 26, 1998, now pending, and to application Ser. No. 09/085,262, entitled Method and System for a Micro Channel Bank for Providing Voice, Data, and Multimedia Services in a Wireless Local Loop System, also filed on May 26, 1998, now pending, and to application Ser. No. 09/085,264, entitled Method and System for Protocols for Providing voice, Data, and Multimedia Services in a Wireless Local Loop System, also filed on May 26, 1998, now pending. Each of these applications is incorporated herein by reference.

FIELD OF THE INVENTION

The present invention relates to the implementation of wireless systems in a local telephone loop environment in what is usually called a Wireless Local Loop (WLL). The present invention particularly addresses a base station architecture used in the implementation of a Wireless Local Loop.

BACKGROUND OF THE INVENTION

The local loop of a telephone system is what some have termed the "last mile" or the "last 1000 feet". This local loop is essentially the copper wire that connects the customer premises (i.e., a house or business) to the telecommunications network. The cost of laying down the copper wire can be very expensive (ie, over $1 per foot). Where communities are rural in nature as in some parts of the United States or in developing countries, laying down such an infrastructure can be prohibitively expensive.

As an alternative to installing a wire or cable infrastructure, these rural communities are turning to wireless solutions for their telecommunication needs. However, conventional wireless telecommunication technologies suffer from a number of disadvantages. Often times, because of the quality of the service, modem connections are frequently difficult to establish and maintain. Even where modem connection are possible, data rates are often prohibitively slow.

A further disadvantage of conventional wireless telecommunication technologies relate to their inefficient use of their RF spectrum resources. Subscribers transferring data over the network occupy channels that would otherwise be available for voice communication. In instances in which many subscribers are, for example, accessing the internet, these conventional wireless technologies suffer from a serious degradation in Grade of Service (GOS) resulting in a increase in the percentage of calls blocked (i.e., Erlang B).

These deficiencies are particularly troublesome in view of the fact that data usage is bursty in nature. Analysis of internet data usage indicates that approximately 95–97% of time, the data network is idle. The aggregate throughput to a user is typically less than 5 kilobits per second.

Therefore, there is a need for a wireless telecommunication system to replace the local loop which more efficiently allocates resources between voice and data communications yet maintains a desirable high GOS. In implementing a wireless telecommunication system, it is critical that a base station be able to communicate in an efficient manner with various subscriber stations.

It is also an object of the present invention to provide a base station architecture that allows the central office and antenna to be conterminous.

It is a further object of the present invention to provide a base station architecture to remotely locate a wireless portion of a base station to be better situated in a wireless system, away from the central office.

It is a further object of the present invention to provide an internal channel concentration capability to reduce the cost and complexity of back haul to the remote base stations.

It is a further object of the present invention to provide a base station architecture that permits wired access to subscribers in one location and wireless access to subscribers in a second location.

It is a further object of the present invention to provide a base station architecture having redundancy and protection switching.

It is a further object of the present invention to provide a base station architecture having, in addition to a low tier communication service capable of providing less than 256 KBPS to the subscriber, a high tier access system such as ADSL channel banks and primary rate ISDN banks capable of providing greater than 256 KBPS access to the subscriber and multiple MBPS interfaces.

It is a further object of the invention to provide a base station system that allows individual subscribers in an area of service seamless telecommunications access (i.e., POTS (plain old telephone system), ISDN (Integrated Services Digital Network), data, multimedia, etc. to a telecommunications network. This system facilitates full voice, data, and fax utilization. This system is designed to replace existing local loops or provide infrastructure for those communities with no local loop in place. In this type of system a subscriber has a corresponding subscriber station and the central office (CO) has a corresponding base station.

SUMMARY OF THE INVENTION

These and other objects are achieved by a base station architecture having a front end and a back end. The front end includes a wideband bus and performs network interface, compression, and concentration functions. The back end includes a subscriber bus and a baseband modem bus and performs modulation and demodulation functions. The back end may also provide wired access to subscribers. The wideband and subscriber buses include a plurality of communication channels for carrying subscriber traffic. The number of communication channels on the wideband bus exceeds the number of communication channel on the subscriber bus. The front end of the base station includes one or more switches capable of mapping traffic from the wideband bus onto the subscriber bus. The back end of the base station includes one or more modems for modulating traffic on the subscriber bus for wireless transmission to a subscriber and for demodulating a wireless transmission from a subscriber onto the subscriber bus.

The present invention provides a base station architecture that permits a high degree of flexibility in how the base station may be configured to accommodate a variety of deployment scenarios. In a first deployment scenario in which demography permits coincident location of the central station and antenna, the front end and back end of the base station are conterminous. In a second deployment scenario in which demography dictates that the antenna be remotely located away from the central station, the front end of the base station is located in the central station and the back end of the base station is located in a remote location. A communication link is provided between the front end of the base station and the back end of the base station. This communication link can include, for example, a microwave back haul, a HDL-driven copper cable, or fiber optic cable. Alternatively, satellite communication link may be provided.

In a further deployment scenario, the base station according to the present invention provides wired access to a first group of subscribers and wireless access to a second group of subscribers. In this alternative embodiment, a POTS channel bank or DLC is provided by replacing the modem portions of the back end of the base station architecture with multi-channel POTS cards and providing a shelf extension. The wideband bus can be used to support up to 128 POTS channels.

The base station architecture provides various capabilities. The base station interfaces to the network with 8 E1/T1 or single SDH/Sonet ring interface. The base station also provides for unconcentrated E1 V5.1 and T1 TR-008, and concentrated E1 V5.2 and T1 TR-303. Concentration of 240 users to the shelf traffic CDMA channel pool (typically 24 channels) is provided. Separation of the concentration and control and back haul to the MODEM and RF reduces back haul costs. The system has optional redundancy and protection switching along with flexible shelf architecture for POTS and DLC applications. Provisioning is provided for Packet Data transport and Frame Relay Network interfaces.

BRIEF DESCRIPTION OF THE DRAWINGS

These and other features, aspects and advantages of the present invention will become better understood with reference to the following description, appended claims and drawings where

DETAILED DESCRIPTION OF THE PREFERRED EMBODIMENT

Figure 1:
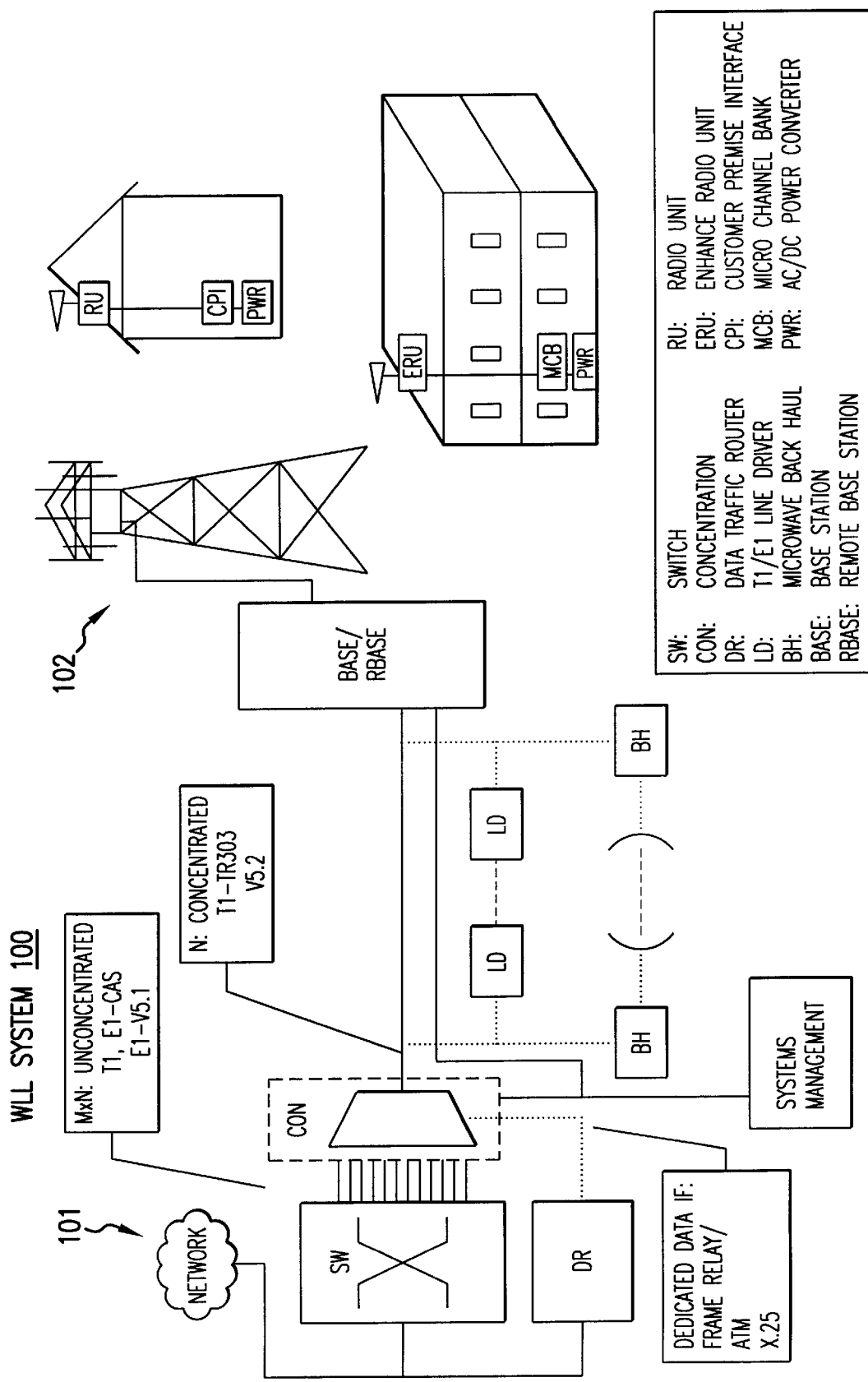
FIG. 1 is a diagram of the different components of a WLL system according to the present invention.

As illustrated in FIG. 1, a wireless local loop (WLL) system 100 provides a plurality of individual subscribers seamless telecommunications access (POTS, ISDN, etc.) to the telecommunications network 101 through one or more base stations 102. A base station 102 provides point to multi-point RF communications channels to individual subscribers in the area of service. A base station 102 according to the present invention is designed to meet the timing, electrical, and associated protocols required to support interfaces to both the telecommunications network and the subscriber's equipment.

The base station architecture according to the present invention facilitates a high degree of flexibility in how the base station may be configured. This flexibility accommodates a variety of deployment scenarios. In a deployment scenario where it is possible to locate a central office and antenna conterminously, an integrated base station subsystem is provided. This is referred to as the "integrated base station" architecture.

Alternatively, in a deployment scenario where the location of a central office is an inconvenient site for an antenna (possibly because of population or interference), a portion of the base station may be remotely situated in a more convenient location. This is referred to as a "remote base station" architecture. Typically, a wired or microwave back haul serves as the communication link between the central office and the remote portion. The present invention addresses the significant costs typically associated with wired or microwave transport to support a remote base station architecture. To reduce these costs, the base station of the present invention advantageously uses subscriber usage statistics (data usage is idle approximately 97% of the time) to concentrate at the central office a large group of subscribers onto a smaller pool of channel. For example, while a particular WLL system may be servicing 200 subscribers simultaneously, all 200 subscribers rarely if ever use the system at the same time. Statistics dictate that only a small fraction of subscribers are actually actively using the system. By concentrating the subscribers at the base station onto a relatively small number of channels, a far narrower bandwidth than otherwise would be required can support the wired or microwave transport to the remote base station.

The flexibility of the base station of the present invention allows it to efficiently address further deployment scenarios. For example, as described above, the central office may be located in a densely populated area which makes it inconvenient to conterminously locate an antenna. The base station can be configured to provide wired access to this densely populated area (e.g., POTS, ISDN, fiber). In addition, the base station can simultaneously service distant populations via wireless access through a remote base station architecture. Similarly, a remote base station can service distant populations via wired access after a wireless back haul while an integrated base station provides wireless access. Thus, the base station of the present invention is capable of providing a combination of both wired and wireless access to subscribers as population demography dictates.

Figure 2:
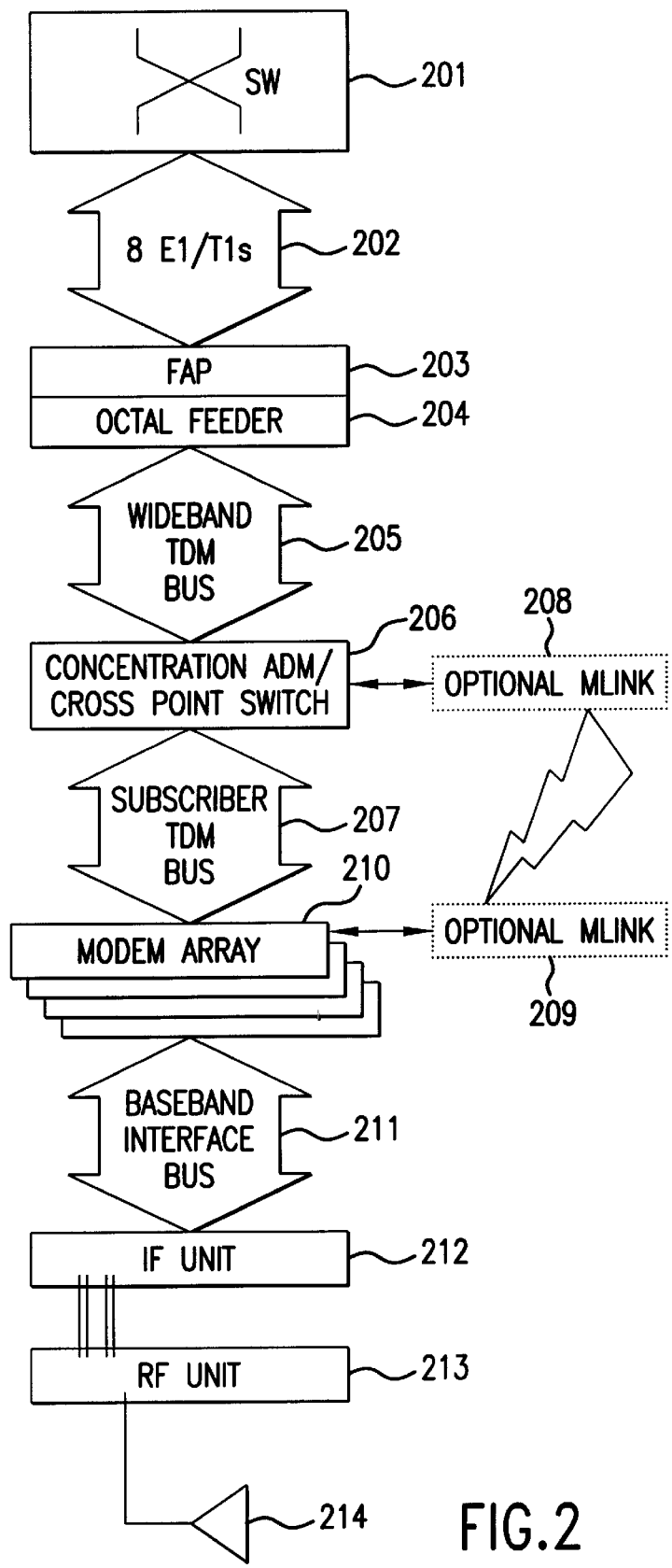
FIG. 2 is a diagram illustrating the traffic flow in a WLL base station according to the present invention.

A generalized description of the traffic signal flow in a base station according to the present invention is illustrated in FIG. 2. A plurality of communication links interfacing with the telecommunications network 101 comprise a network interface bus 202 (8 E1/T1 link are shown). The network interface bus comes from switch 201 and terminates to a fuse and alarm panel (FAP) 203 in the base station. A octal feeder card 204 processes the network interface bus 202 and multiplexes it onto one or more wideband TDM buses 205. An Add Drop MUX (ADM) card 206 concentrates the wideband TDM bus 205 to a subscriber TDM bus 207. The ADM card 206 also performs voice and data compression. The concentration and compression functions performed by the ADM card 206 are some of the significant advantages of the present invention.

Concentrated traffic and control on the subscriber TDM bus 207 are provided to the remote portion of the base station consisting of the modem array 210, baseband interface bus 211, IF and RF Units 212 and 213 and the antenna 214. The Modem Array card 210 performs traffic and control multiplex/demultiplex functions and WLL air interface modulation/demodulation. CDMA TX and RX data are provided over a baseband interface bus to the IF unit 212. The IF unit 212 provides summation, filtering and IF conversion of the TX data. The IF unit 212 also provides down conversion, filtering, and A/D conversion into a common pair of X-bit wide I and Q receiver buses (10/12 bit buses are shown). The RF unit 213 provides final conversion to and from the IF.

In the remote base station architecture, modem link (MLINK) cards 208, 209 provide the mechanism for communicating between the central office and the remote base station. A microwave back haul is provided between MLINK cards 208 and 209. Alternatively, a HDL long lead driver or fiber may be used as the communication link between the central office and the remote base station.

Figure 3:
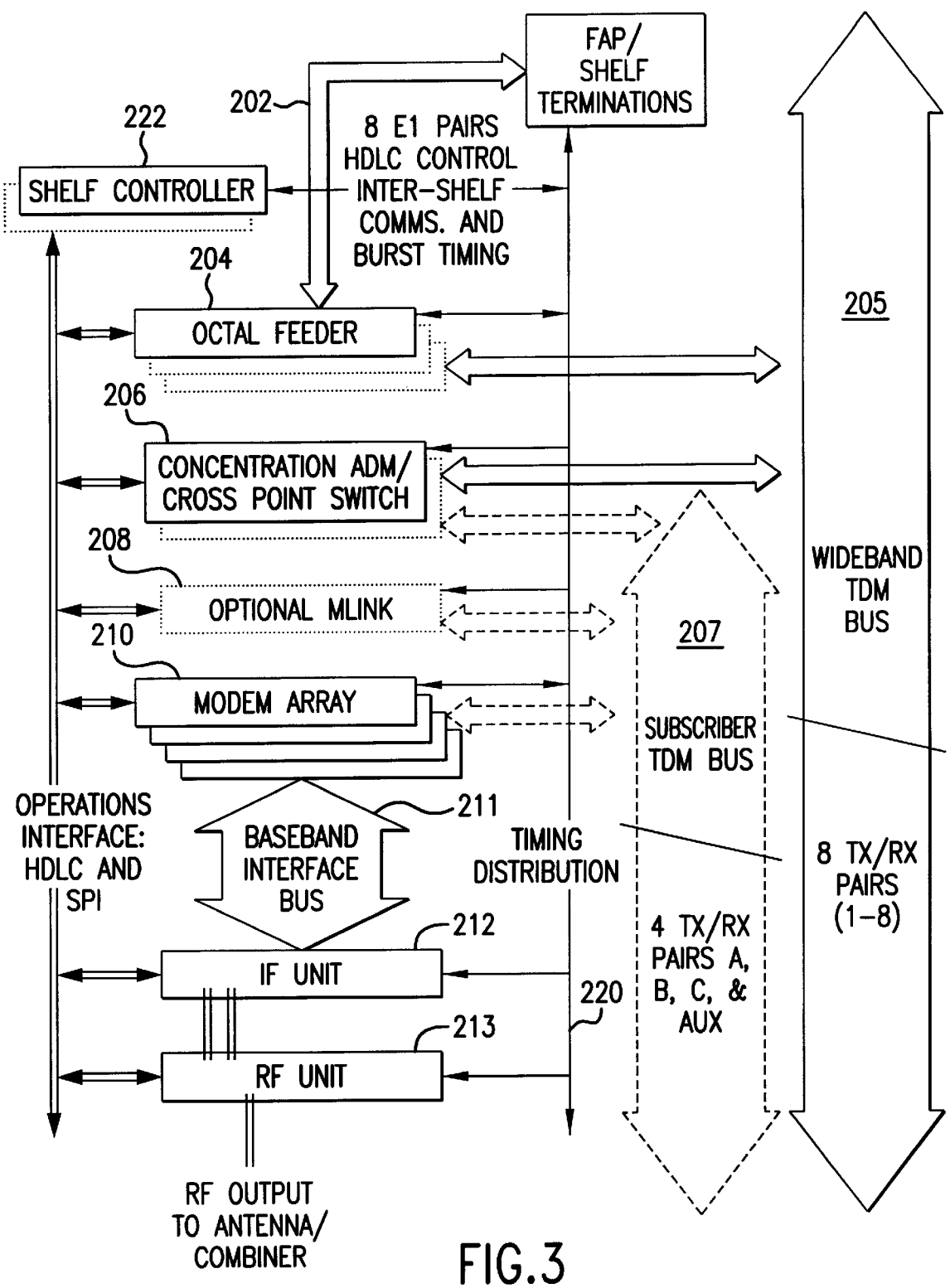
FIG. 3 is a diagram providing further details of integrated base station shelf traffic and communications according to the present invention.
Figure 4:
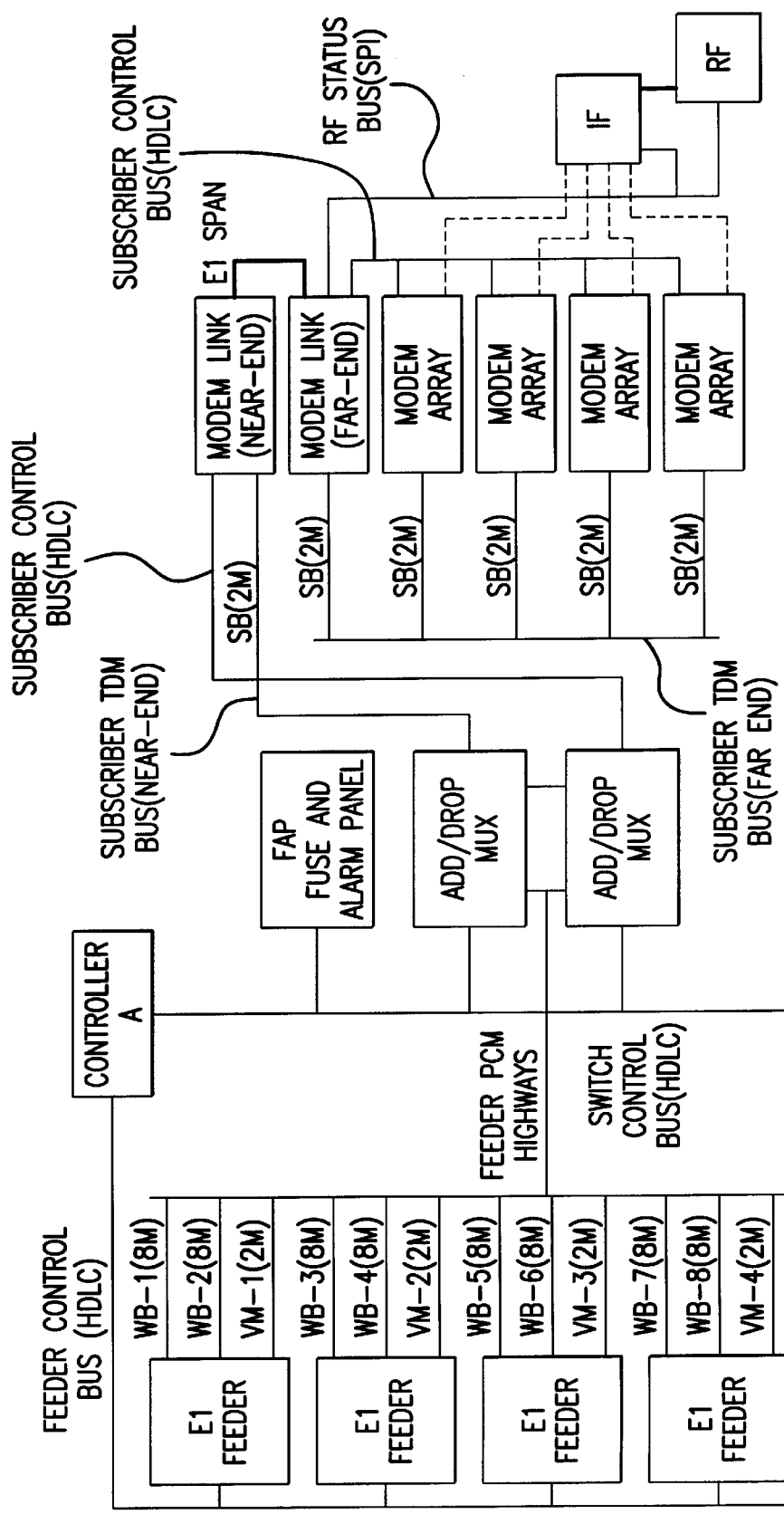
FIG. 4 is a diagram illustrating the integrated base station shelf control architecture according to the present invention.

An integrated base station architecture according to the present invention provides a complete sub-system for up to 240 users in one antenna sector for base station and antenna deployed at the central office. Traffic and communication flow in an integrated base station according to the present invention is illustrated FIG. 3. A backplane and control architecture in an integrated base station according to the present invention is illustrated in FIG. 4. Traffic and control of the shelf are provided by several functional bus structures. The backplane architecture provide shelf-to-shelf interconnection and routing of the buses. In the preferred embodiment, 3 shelves/sectors make a single WLL cell. However, 4 and 6 sector arrangements are also contemplated.

The principle bus structures include a network interface bus 202, wideband TDM bus 205, subscriber TDM bus 207, timing distribution bus 220, operations bus 221, and baseband interface bus 211. The network interface bus 202 interfaces with the telecommunications network 101. The network interface bus 202 provides 8 to 24 E1/T1 link pairs terminated to the shelf on the FAP (Fuse and Alarm Panel) 203. The network interface bus 202 further provides craft port, inter-shelf timing and communications, and burst timing.

Figure 5:
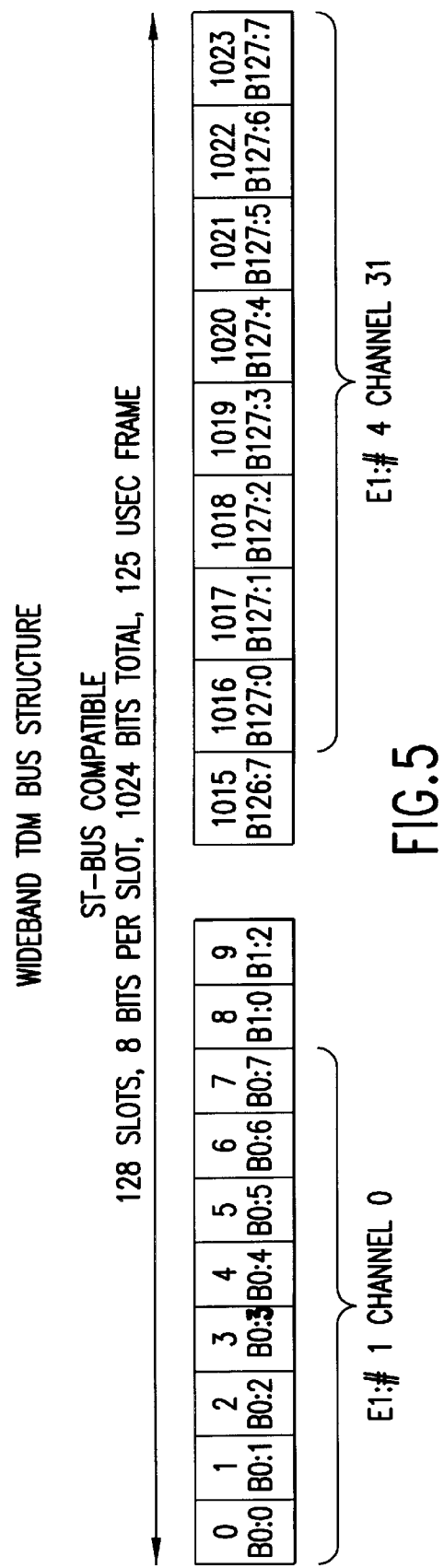
FIG. 5 is a diagram illustrating the wideband TDM bus structure according to the present invention.

A wideband TDM bus 205 according to the present invention is illustrated in FIG. 5. A wideband TDM bus 205 provides 8×8 MBPS ST-BUS compatible TDM links between the octal feeders 204a–d and the ADM cards 206a, 206b. The wideband TDM bus 205 is capable of carrying up to 128 traffic channels. The wideband TDM bus 205 is a byte interleaved TDM bus combining 4×E1 inputs. According to the preferred embodiment, the frame repeats every 125 Usec and operates at 81.92 MHz. It is well understood that other operational speeds are contemplated by the present invention. The wideband TDM bus 205 conforms to the ST BUS specification.

The wideband TDM bus 205 may also be configured to provide communication paths from one shelf to another shelf to provide among other things redundancy. For example, if one shelf's RF back end goes down, the wideband TDM bus can provide a communication to the RF back end of another shelf. In addition, wideband TDM bus may be configured to provide communications paths from a shelf to a sub-shelf.

Figure 6:
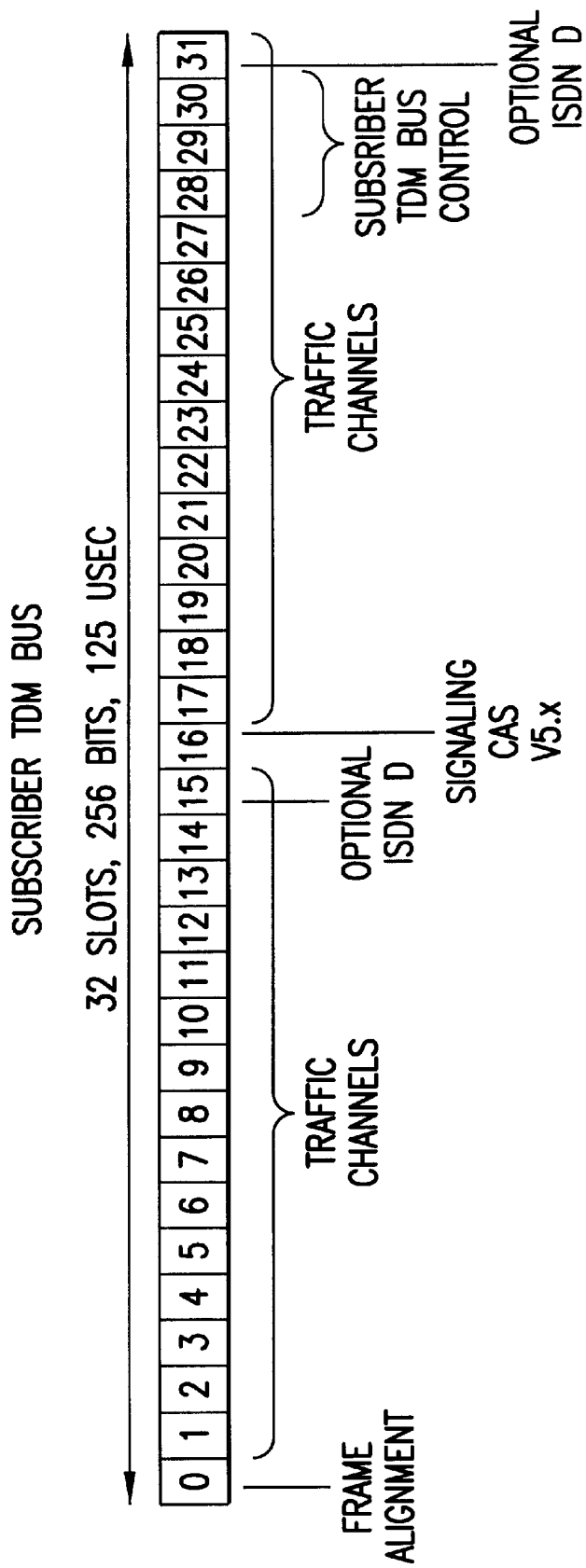
FIG. 6 is a diagram illustrating the subscriber TDM bus structure according to the present invention.
Figure 7:
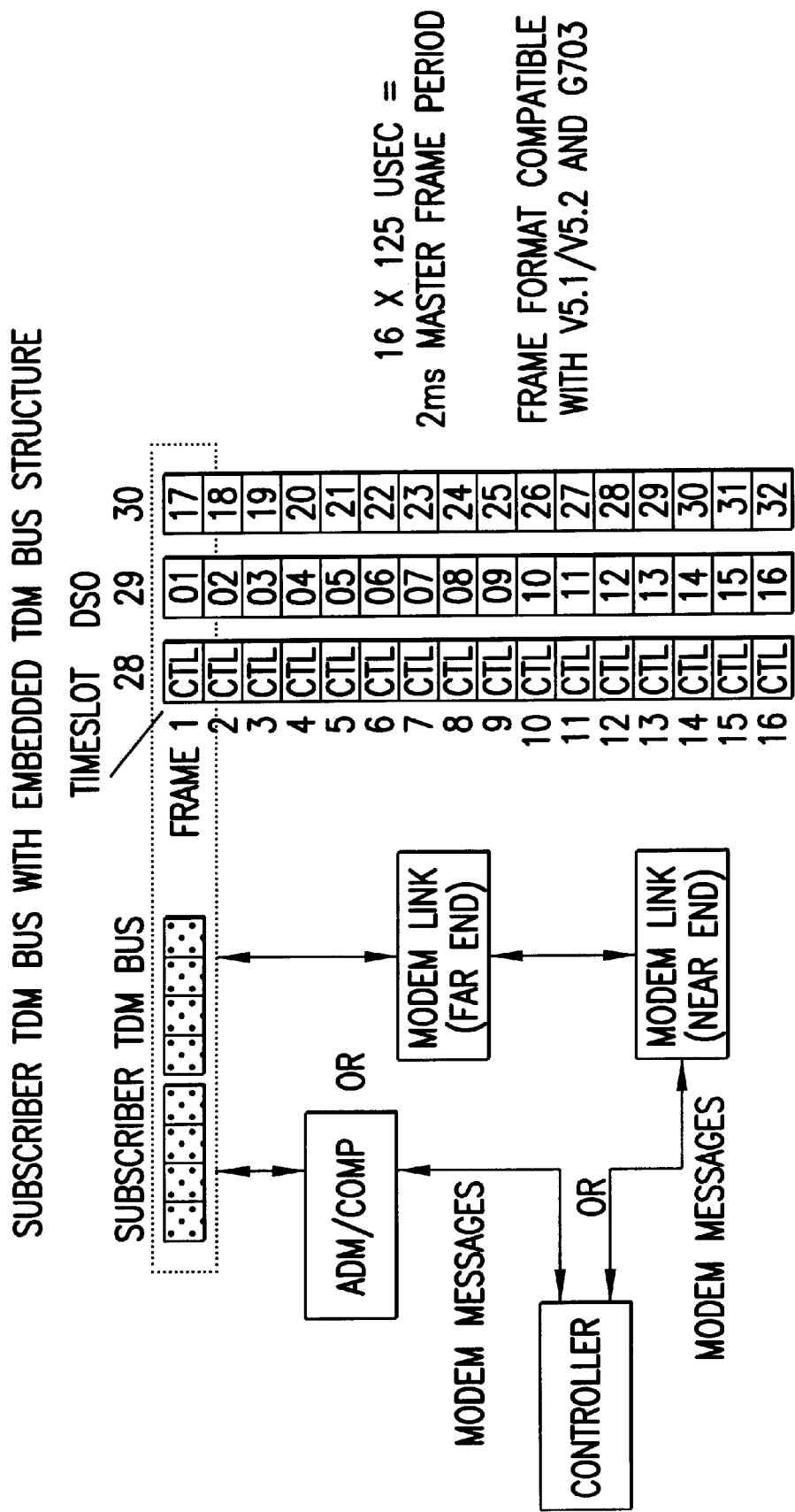
FIG. 7 is a diagram of an embedded HDLC TDM bus structure according to the present invention.

A subscriber TDM bus 207 according to the present invention is illustrated in FIG. 6. The subscriber TDM bus 207 provides 4×2 MBPS TDM links carrying up to 32 channels of traffic and control between the ADM cards 206a, 206b and the modem array cards 210a–d. The subscriber TDM bus 207 is a modified E1 link compatible with V5.1/2 and primary rate ISDN. In an alternative embodiment, an embedded HDLC TDM bus structure is used for message control to the DSP processors in the modem array cards 210a–d. This embedded TDM control structure is illustrated in FIG. 7. It provides 32×4 KBPS control channels and a 64 KBPS common control channel for operations and call processing.

The timing distribution bus 220 provides miscellaneous timing and clock signals for all of the cards in the shelf. The timing distribution bus 220 provides the following clock signals: 10.24 MHz and modem ASIC clock signal (40.96 for the standard air interface and a variable clock signal for extended guard air interface). Additional clocks signals are E1 Master/Subscriber TDM BUS frame sync, wideband TDM bus sync, and CDMA TDD burst sync. It is well understood to those skilled in the art that these signals are designed to achieve compliance with various telecommunications standards and that other clock signals are within the scope of the invention.

The operations bus 221 provides an operations and control bus to a shelf controller 222 (222a, 222b in FIG. 4). The operations bus handles card present signals, card enable signals, JTAG serial bus with signal TCLK, TMS (decoded board select), TDI, TDO and TRST, a serial communications bus (SPI) for RF and IF control, and 3 HDLC bus networks for feeder, modem, and switch control functions.

The baseband interface bus 211 provides TX and RX components. The TX component of the baseband interface bus 211 provides composite serial links from each CDMA modem channel in the modem array cards. Two alternative and distinct bus architectures for the TX component of the baseband interface bus 211 are contemplated by the present invention. The first architecture involves a chip rate interface with an I and Q serial line running at 4× the chip rate. The data format provides for ch1, ch1 enable, ch2, and ch2 enable signals. This allows independent access of all 64 CDMA channels (both I and Q) in 16-dual modem ASIC's in the 2 Modem Array cards. The spreading function is performed by a modem ASIC. The second architecture is a symbol rate interface with an I and Q serial line running at 4× the symbol rate. The data format provides for ch1, ch1 enable, ch2, and ch2 enable signals. This allows independent access of all 64 CDMA channels (I and Q) in 16-dual modem ASIC's in the 2 Modem Array cards. The spreading function is performed in the IF card filter/combiner FPGA. The symbol rate interface has two distinct advantages. First, it operates at significantly lower clock rates across the back plane. Secondly, this is scaleable to alternative wideband AIR Interface implementations.

The RX component of the baseband interface bus 211 provides a composite X-bit I/Q multiplexed RX A/D bus. According to the preferred embodiment, the RX I/Q bus provides 10/12 bit Inphase and 10/12 bit Quadrature A/D data sampled at 2 times the chip rate (5.12 MHz for 32 KBPS CDMA channel or 10.24 MHz for 64 KBPS CDMA channel). These samples are multiplex at 2× the sample rate into a single 10/12 bit bus. Clock and Select signals are provided. This interface conforms to the Analog devices AD9021 multiplexed bus architecture.

Figure 8:
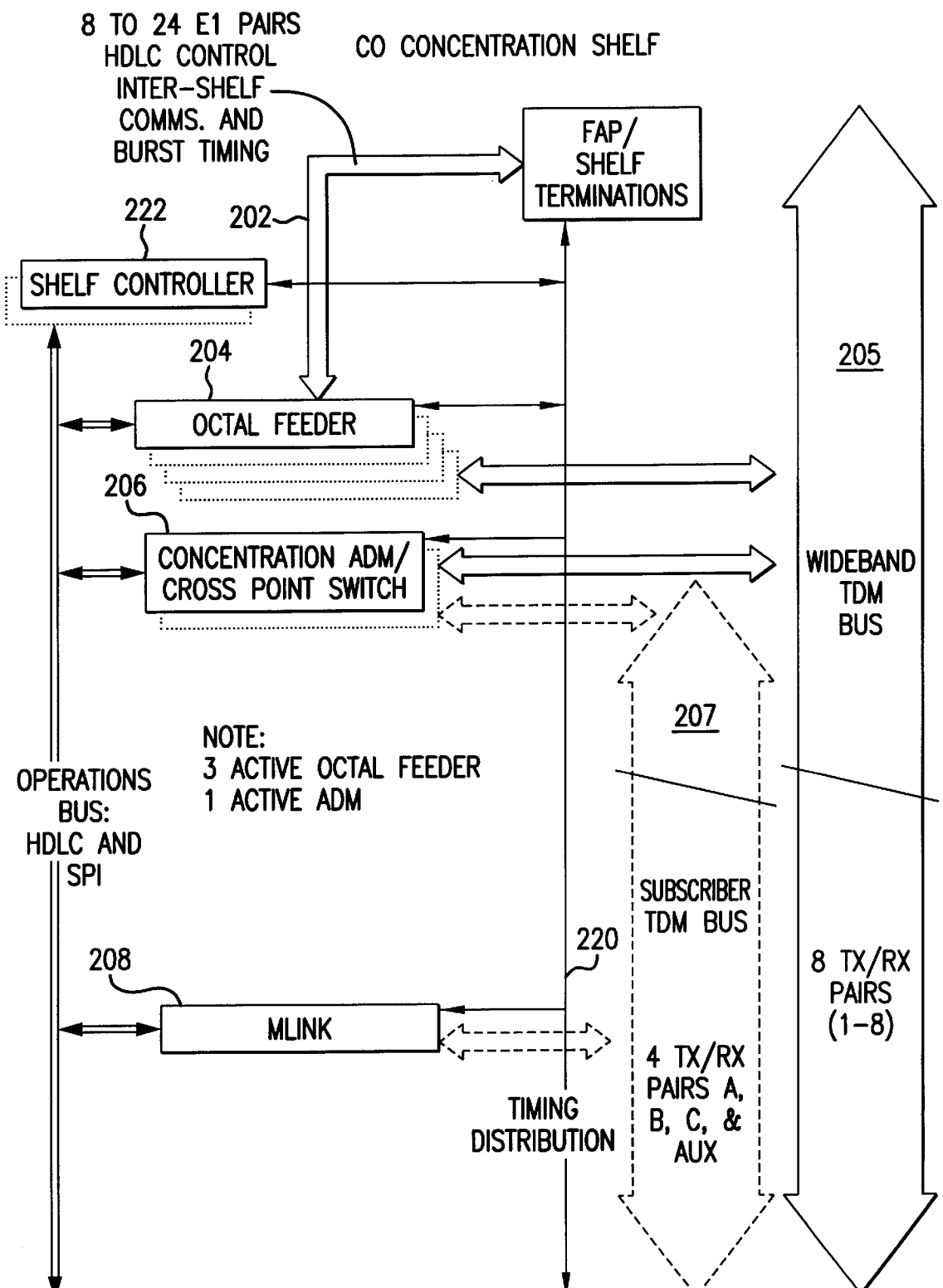
FIG. 8 is a diagram illustrating the central office concentration shelf according to the present invention.
Figure 9:
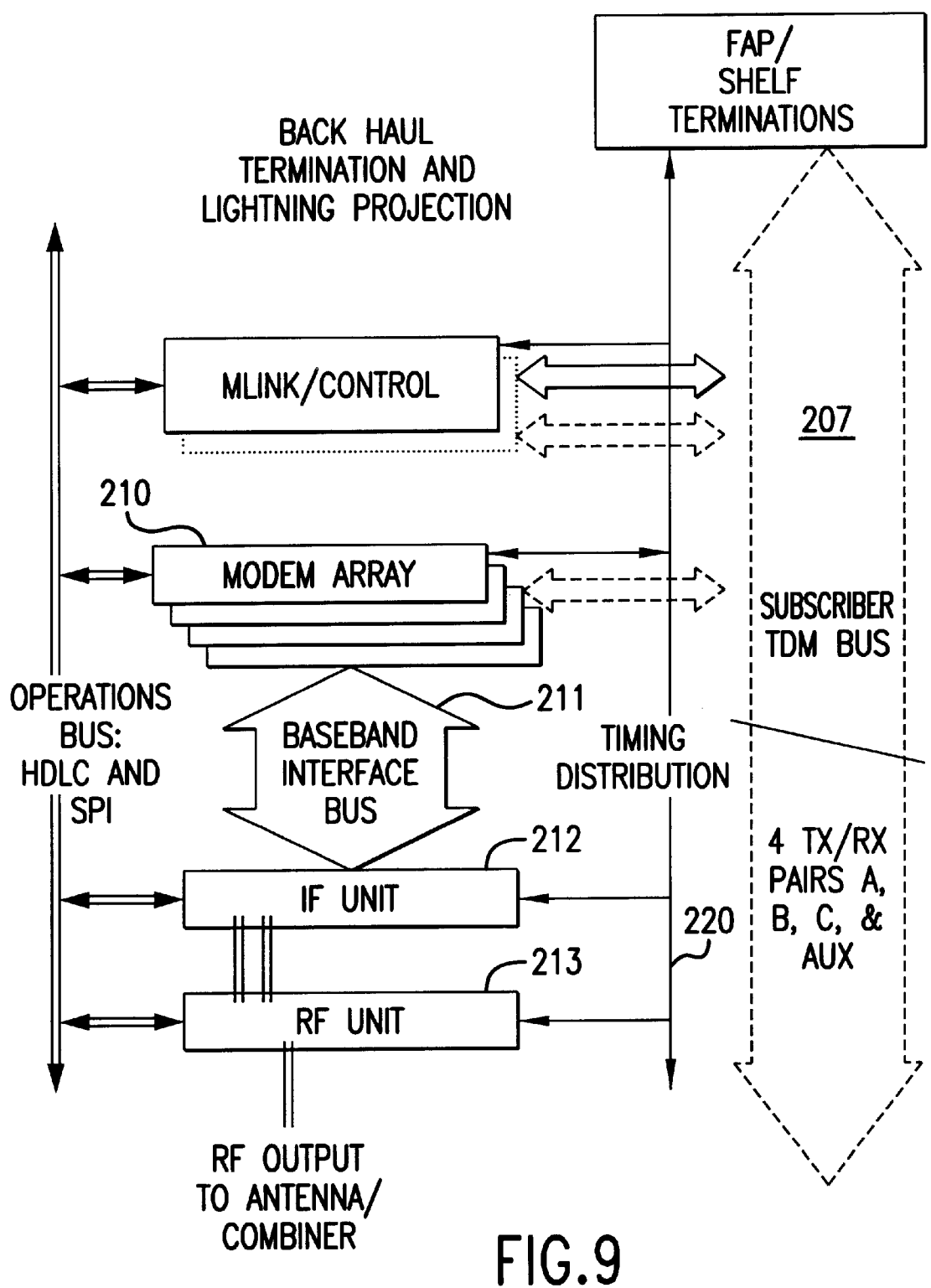
FIG. 9 is a diagram illustrating the remote base station shelf according to the present invention.

FIGS. 8 and 9 illustrate the remote base station architecture of the present invention. The remote base station architecture comprises a central office concentration shelf, illustrated in FIG. 8, and a remote base station shelf, illustrated in FIG. 9. The central office concentration shelf makes full use of the Wideband 205 and Subscriber bus 207 assets for extended transport of a 3 sector/shelf cell remote base station. The central office concentration shelf includes modem link (MLINK) cards 208, 209 to communicate with the remote base station shelf. The central office concentration shelf further includes a network interface bus, operations bus, and timing distribution bus. These assets provide analogous function to those described above in connection with the integrated bus station architecture. The Remote Base station shelf is shown in FIG. 9.

Figure 10:
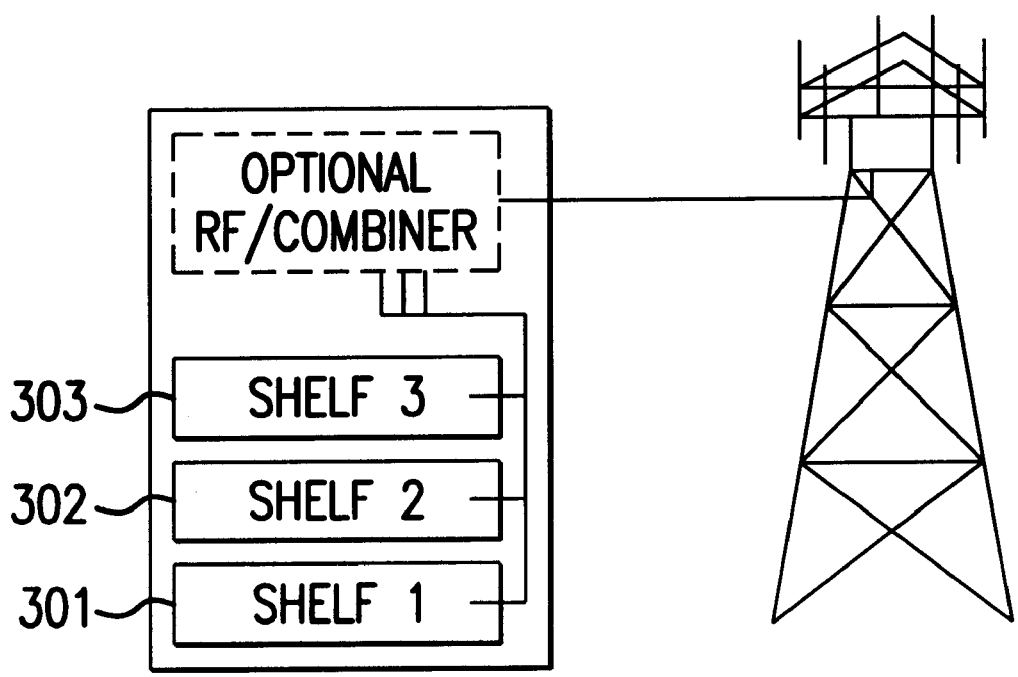
FIG. 10 is an illustration of the physical configuration of the base station according to the present invention.

A physical configuration of the base station according to the present invention is illustrated in FIG. 10. A typical cell deployment is based on 3×120 degree sectors and requires 3 shelves for operation. Alternative cell deployments are contemplated including 6 sectors with 60 degree sectors as well as dual frequency sectors. The base station includes a plurality of shelves: shelf 1 301, shelf 2 302, and shelf 3 303. Each of the shelves 301, 302, 303 has a plurality of card slots in which one or more cards are inserted. A shelf back plane provides connections or buses through which the cards communicate with each other.

Figure 11:
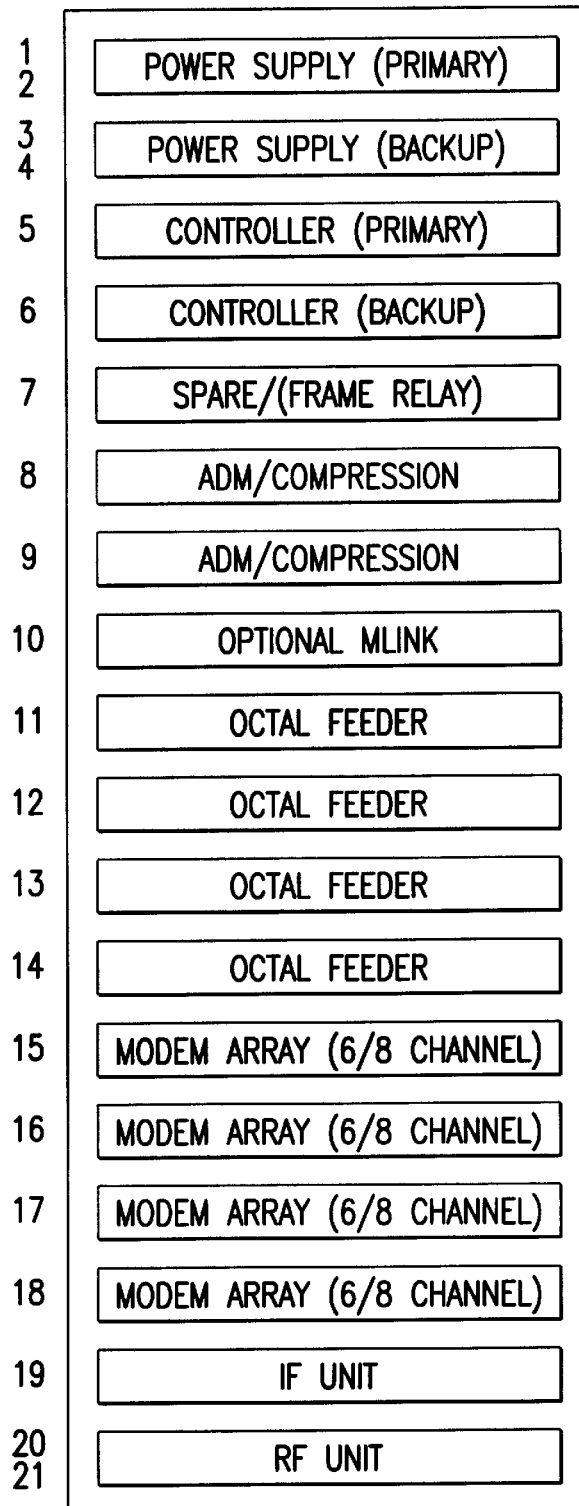
FIG. 11 illustrates a base station shelf according to the present invention.

A shelf configuration, including physical form factors and rack layout for base station deployment, is depicted in FIG. 11. The integrated base station shelf illustrated in FIG. 11 is used for deployment where the central office and the antenna tower are co-located. In this configuration both the control, concentration, and network interface functions and the RF modem functions are combined on a single shelf. The remote base station shelf provides complete rf modem function and requires a single E1 interface with concentrated control (Subscriber TDM Bus) provided by the concentration unit. The E1 interface is provided by either HDSL interface or microwave back haul and is provided to the MLINK card. The card positions are identical to FIG. 11 with the controller in slots 5 and 6 and the ADM cards in slots 8 and 9 removed. The central office shelf provide network interface, radio system control, concentration control, and concentrated interface via Modem Bus to the remote base station. The card positions are similar to FIG. 11 with the modem array, IF and RF cards removed from slots 15 and 21.

Figure 12:
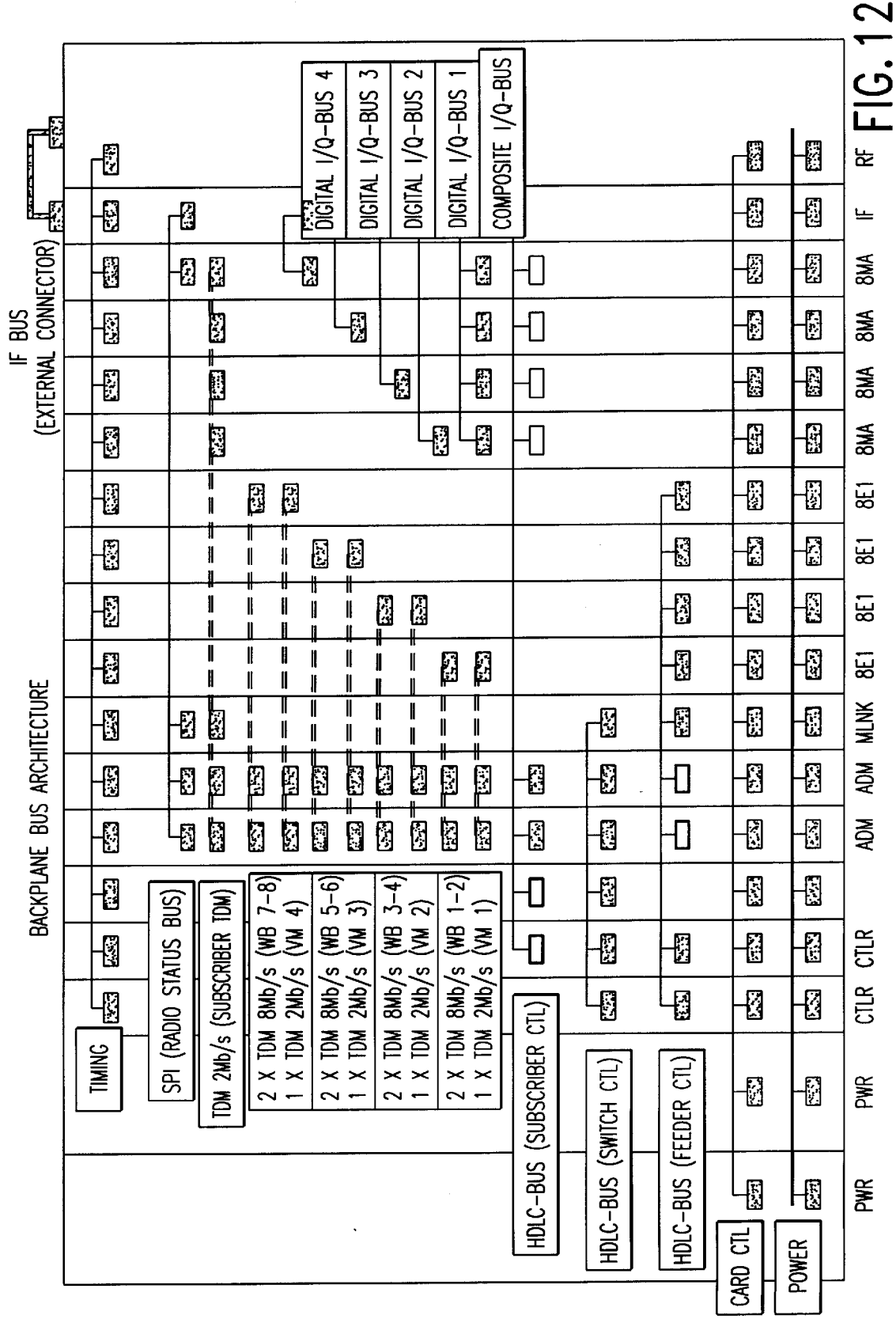
FIG. 12 is a diagram illustrating the backplane bus architecture according to the present invention.

The shelf back plane is depicted in FIG. 12. The shelf back plane is compatible with the J1/J2 connector mechanics for 6 U VME. Bus functions are split between J1 and J2 connectors. Card slots are keyed for proper card insertion. Electronic slot identification is provided, obviating the need for mechanical keying. Each slot uses a 4-bit identifier to define slot position to establish the position within the shelf. These bits are used to define the card address within the operations bus architecture. Dual redundant, power supplies are provided. The back plane conforms to standard VME power pin assignments. Digital voltage conversion from 5.0V to low voltage logic (3.3, 2.7, etc) is performed by high efficiency DC to DC on each board as required. This allows for rapid adoption of low voltage standards.

Hot insertion is supported by all cards. Extended power pins are used to ensure that all bus transceivers are tri-stated during insertion. Power pins are designed to limit current in rush (surge). Bus signals are isolated from the back plane until the shelf controller asserts a bus enable to the individual card. A card can be removed from the bus if it fails fault isolation. The hot insertion and card isolation features in conjunction with on board multiplexing allows for sparing and redundancy of critical cards (e.g. shelf controller card, Octal Feeder card, etc.).

A more detailed description of the various circuit cards used in the present invention is hereinafter provided. The shelf controller card 222 provides the overall software control, communication protocols, call processing, concentration, and systems management of a single base station shelf. The processor is provided. In the preferred embodiment, the processor is based on a Motorla QUICC communications engine although other communication engines are equally well suited. The HDLC bus and SPI serial links used for inter-card communications are compatible with the QUICC timing and interface specifications.

The shelf controller 222 provides for detection and configuration of any card placed in a shelf. Tasks associated with this function are: to provide a signal indicating a monitor card is present; to provide a signal indicating that the cards require configuration or a firmware load; to use JTAG boundary scan to test where supported and for in field upgrades of FPGAs; to provide fault monitoring, reporting, and redundant card activation and protection switching; and to control all shelf LED indicators.

The Shelf Controller 222 also provides the management system interface. The following management interfaces are supported: front panel access for local terminal access via a UART; FAP interface to UART interface; and access to any HDLC/traffic channel via parallel interface to the octal feeder card.

The shelf controller 222 performs all concentration and high level air interface call management functions (call action processing). The HDLC bus interfaces provide the primary means for monitoring call/traffic activity, and system control to the ADM and octal feeder cards. Processing on board the octal feeder card provides an indication of incoming calls from the network interface. Messages on the subscriber TDM bus provide an indication of out going calls from the WLL system via the CDMA modem array board. This card has optional +1 sparing in the base station Timing distribution signals are generated in the shelf controller 222. The signals are phase locked to network time from either the recovered E1 clock from a selected octal feeder E1/T1 channel (i.e., clock master) or an external clock source via connection to the FAP. In addition, the following sync pulses can either be generated or provided via external FAP connection: E1 Master/Subscriber TDM BUS frame sync; Wideband TDM BUS sync; and CDMA TDD BURST sync.

Figure 13:
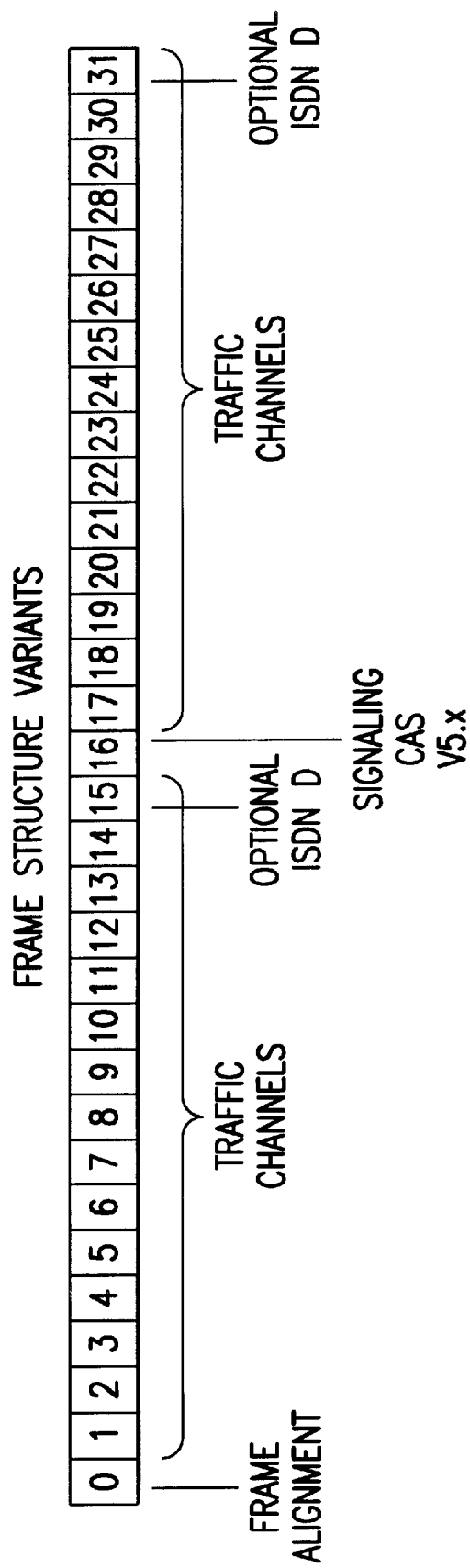
FIG. 13 is a diagram illustrating an E1 frame structure according to the present invention.

The octal feeder 204 provides a switch side interface for 8 E1/T1 ports. The present invention is appropriate for the United States as well as the international market, which is E1 based. The present invention, therefore, support the following protocols: E1 CAS, 30×64 KBPS speech/data channels and ABCD signaling embedded in time slot 16; V5.1, 30×64 KBPS speech/data channels and message based signaling protocol embedded in time slot 16; V5.2, concentrated with 30×64 KBPS speech/data channels, flexible message channel assignment in accordance with the standard; T1 CAS with 24×64 KBPS speech/data channels; and T1/TR-303 with 24×64 KBPS speech/data channels. FIG. 13 illustrates the E1 frame structure.

The octal feeder 204 terminates directly to the Wideband TDM bus with fixed assignment based on port assignment of the card. ABCD or message based channel activity and signaling are performed using a local processor and multichannel HDLC controller. Call activity and message processing and termination to and from the HDLC or ABCD control channels are provided over the parallel interface to the shelf controller.

The octal feeder 204 acts either as a clock master or slave. In general, feeders 204 are slaved to the wideband TDM bus. The timing of the wideband TDM bus is derived from recovered timing from a nominated single E1/T1 card designated by the shelf controller. Additional HDLC processing may be provided to support V5.1, V5.2, and TR-303.

Modem links 208, 209 (MLNK) provide the mechanism for locating the modem and RF portions of the base station remotely from the feeders and ADMs. MLNK 208 at the central terminal provides 1 to 3 E1 interfaces to MLNK 209 at the remote base station. MLN may also provide the functionality of the controller card. This eliminates the need for a separate controller card in remote base station applications.

Figure 14:
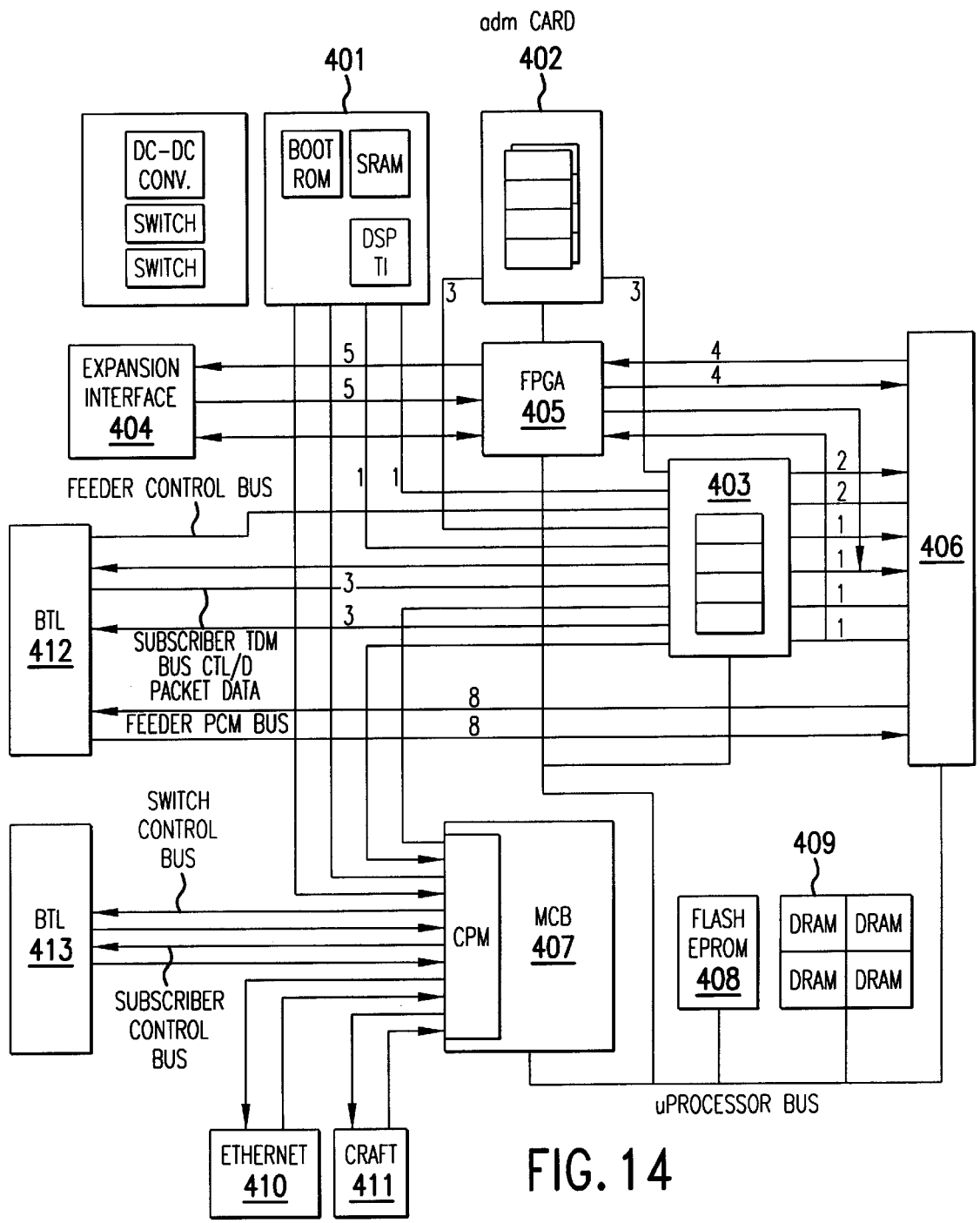
FIG. 14 is a diagram illustrating an architecture of a ADM/compression unit according to the present invention.

An architecture for an ADM/compression unit 206 is shown in FIG. 14. The ADM/compression unit 206 comprises a tone generator 401, ADPCM transcoder for compression 402, a plurality of rate converters 403, an expansion interface 404, an FPGA 405, a channel switch 406, a microprocessor 407, flash EPROM 408, DRAM 409, ethernet 410, craft 411, and BTL 412, 413. The ADM/compression unit 206 provides 2048 port switching function with 32 port mapping between the Wideband TDM bus and the Subscriber TDM bus. Traffic channels are routed to the voice and/or data compression engines as required. ADPCM compression is provided. Shelf controller messages may be passed to the modem array, IF, and RF cards via bi-directional TDM slots using HDLC.

The ADM/compression unit 206 can support 240 wireless channels. However, this ADM card may be replaced by an appropriate card that can support up to 750 wired channels. The present invention can also be configured to support a hybrid combination of wired and wireless channels. The present invention provides for modularity whereby the E1 and ADM card set is separable from the modem arrays, IF and RF cards such that these are separable. The E1 and ADM card set could, for example, be situated at the central office and the other cards be positioned at a remote location so as to be better located for wireless coverage. The architecture of the present invention allows for the wireless side to use a long distance driver that has a concentrated remote access that can use either microwave backhaul, copper, or fiberoptic. The wireless part could then be situated for better wireless transmission. Note that the interface described here is an E1 interface, however, a C1, OC3, or other interface may also be used.

The ADM/compression unit 206 additionally may be also used to move data to and from a frame relay card (shown in slot 7 of FIG. 11). The frame relay card provide packet assembly and dissassembly. The frame relay card assembles and disassembles data packets to provide the virtual LAN function as described in the co-pending application identified and incorporated by reference above.

Figure 15A:
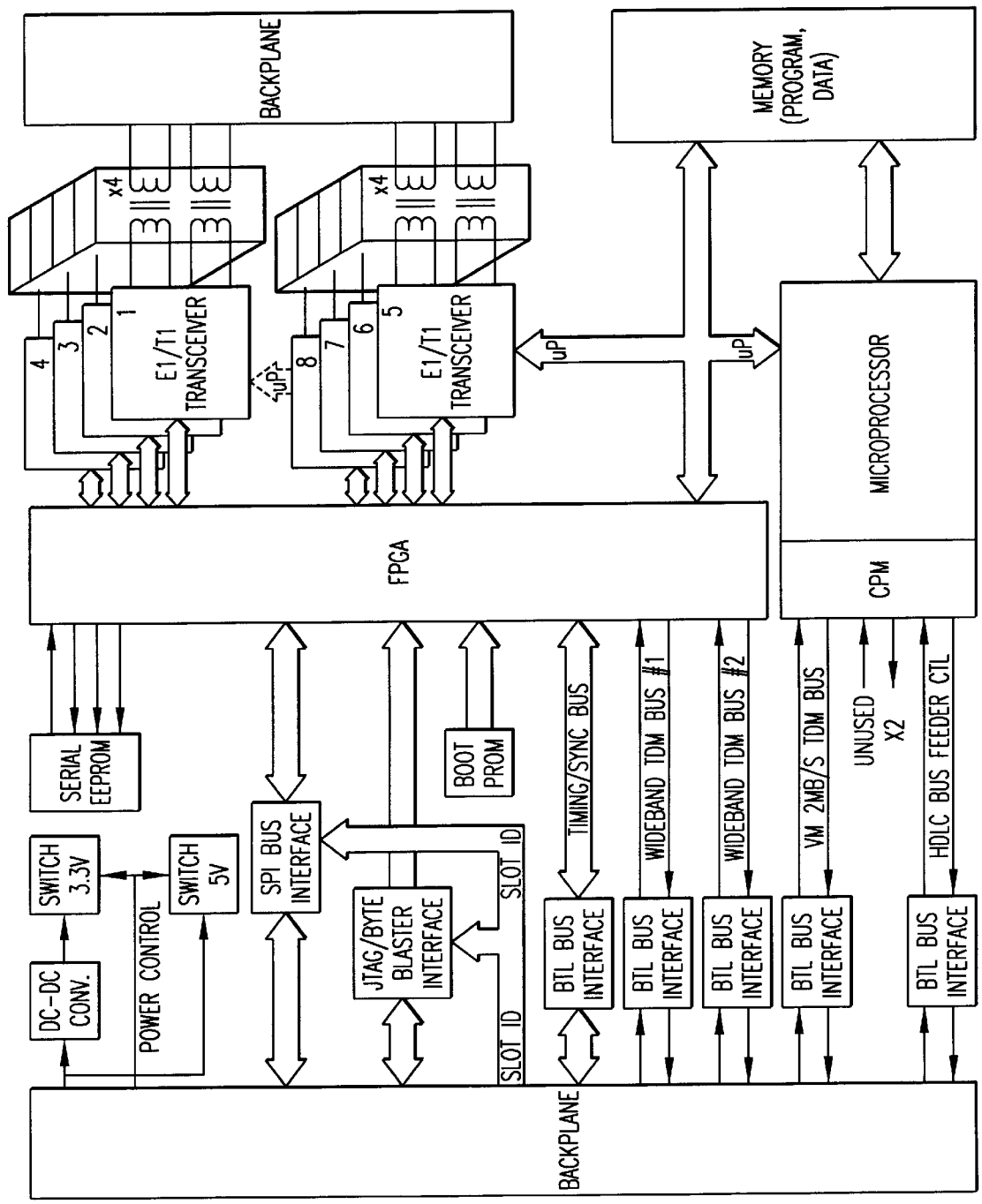
FIG. 15 is a diagram illustrating an architecture of a modem array according to the present invention.
Figure 15B:
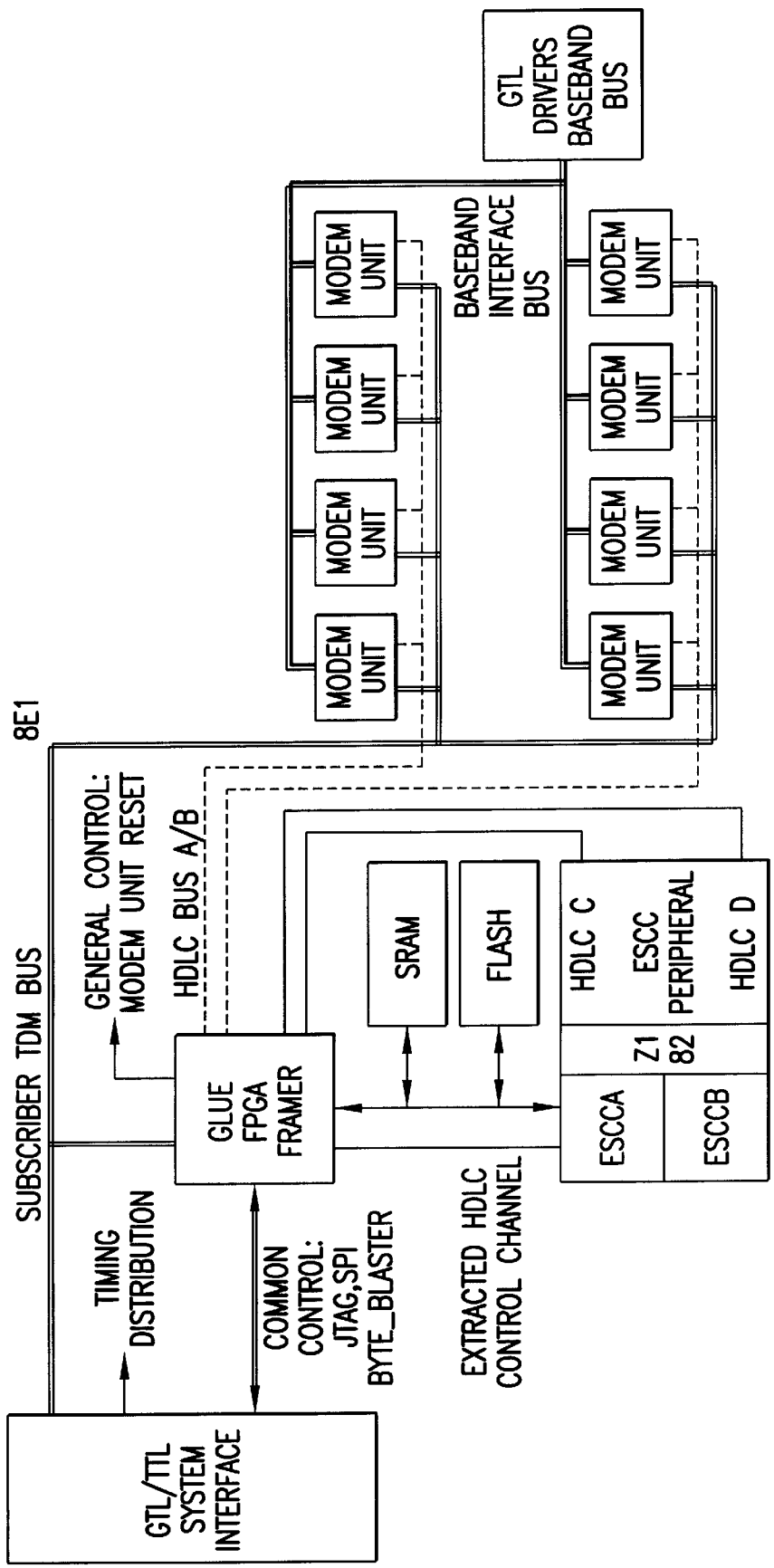

An architecture of a modem array 210 is illustrated in FIG. 15. The modem array 210 provides integrated packaging of 8 individual modems. A modem consists of an integrated MODEM ASIC, DSP, and SRAM. In addition, a Z182 processor provides board initialization and DSP SRAM load, and system/configuration management functions (i.e. SYS and SM functions in the Software architecture). Communications to the Z182 modem array processors is provided to either the MLNK (remote base) or controller (integrated base) via an HDLC bus.

All traffic, call processing messaging, and channel operations configuration are provided via the subscriber TDM bus. Modem identification is provided by both slot number and location on the board. The shelf controller can allow any single or group of modems to function in a particular mode for support of the WLL air interface.

When operated in 32 KBPS CDMA channel mode, service can be provided at 32, 64, 128, and 256 KBPS. Service at 64 KBPS service is provided with two individual 32 KBPS channels or a single composite 64 KBPS channel. Similarly, 128 KBPS service is provided with four individual 32 KBPS channels or two 64 KBPS channels (basic rate ISDN). Service at 256 KBPS is provided with eight channel multiple line service for micro-channel bank (MCB) applications. Note that optional 16 KBPS ADPCM is supported to double channel capacity for MCB applications.

The present invention will also support 64 KBPS CDMA channels (2× bandwidth operation) and provide 2, 4, or 8 64 KBPS lines of service. Clock, subscriber TDM bus sync, and master WLL Air Interface TDM pulse timing is provided by via the back plane from the Controller/MLINK. Digital I/O is provided to the IF card. Serial composite I/Q links from each modem is terminated into the IF for transmit. Common 10/12 bit I/Q baseband pairs are used for the modem receiver.

Figure 16:
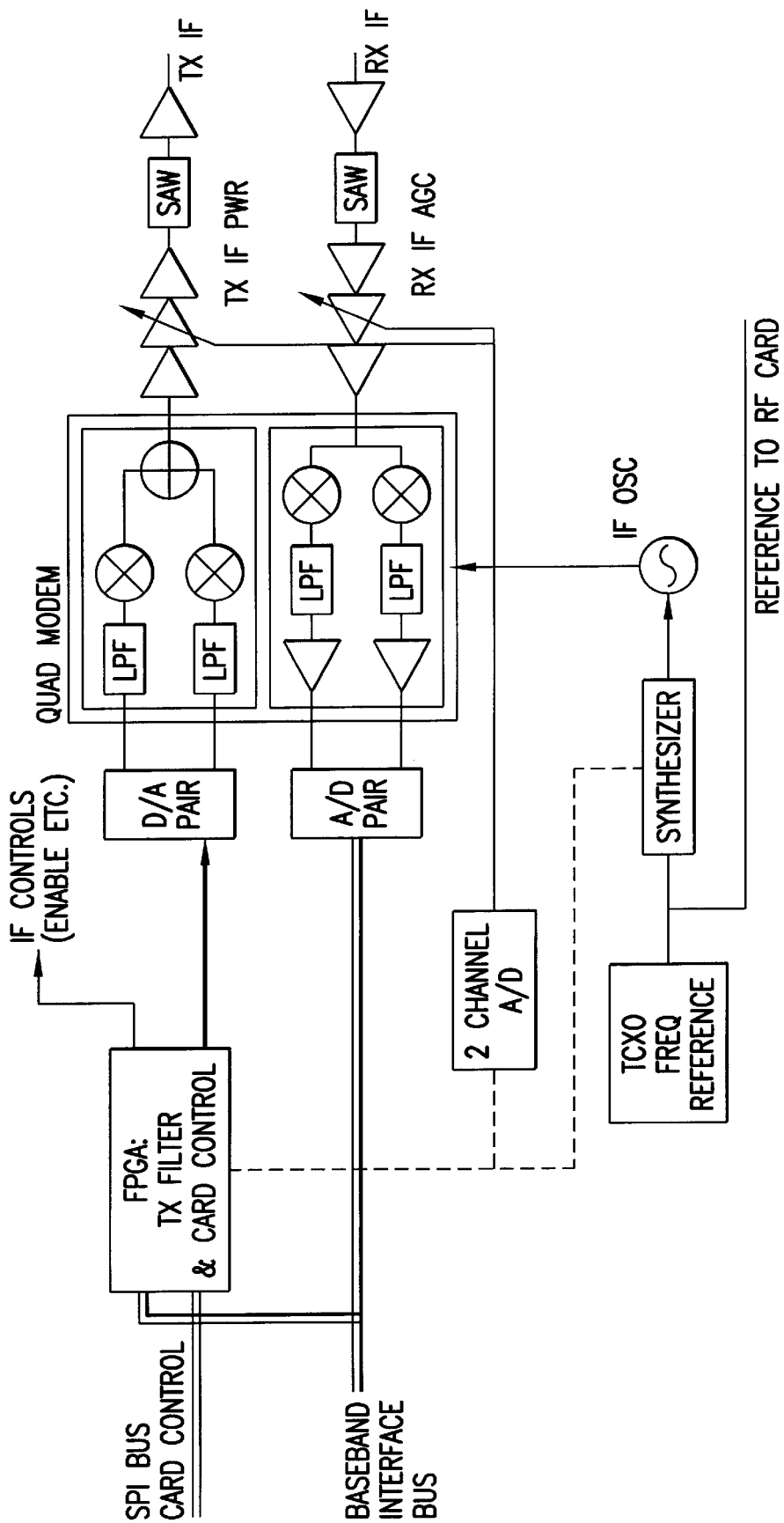
FIG. 16 is a diagram illustrating an architecture of an IF unit according to the present invention.

An architecture of the IF card 212 is illustrated in FIG. 16. The IF card 212 provides the following functionality: Serial to Parallel conversion of the TX I/Q modem signals; Option (spreading of the I/Q symbols); Composite sum of TX I/Q and soft limit; Raised cosine TX filtering; DAC conversion and IF up convert; IF down convert and A/D conversion; and master RF/IF reference TCXO (2 ppm).

Figure 17:
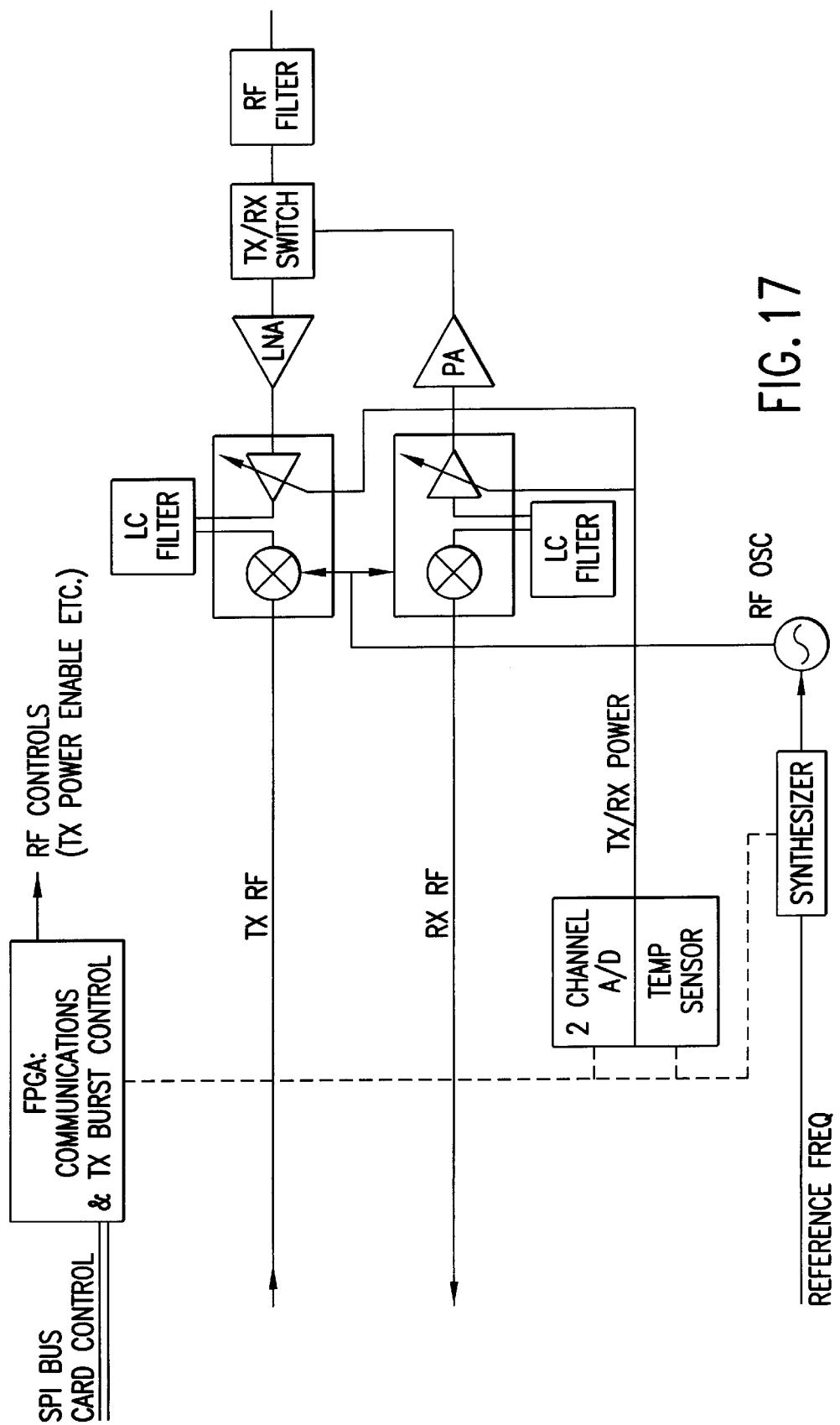
FIG. 17 is a diagram illustrating an architecture of an RF unit according to the present invention.

An architecture of the RF card 213 is illustrated in FIG. 17. The RF card 213 provides the following functionality: RF to IF up and down conversion; RX Low Noise amplification (LNA); RF power amp; and RX and TX gain adjustment for variable cable losses. Heat dissipation is a critical design issue for the RF card. To provide improved air flow, a double wide slot is allocated for the RF. Due to the lower gain 120 degree sector antenna coverage and transmission of 28 CDMA code channels, the base station must generate between 3 and 6 dB more RF power than a low cost subscriber RU RF sub-section.

Figure 18:
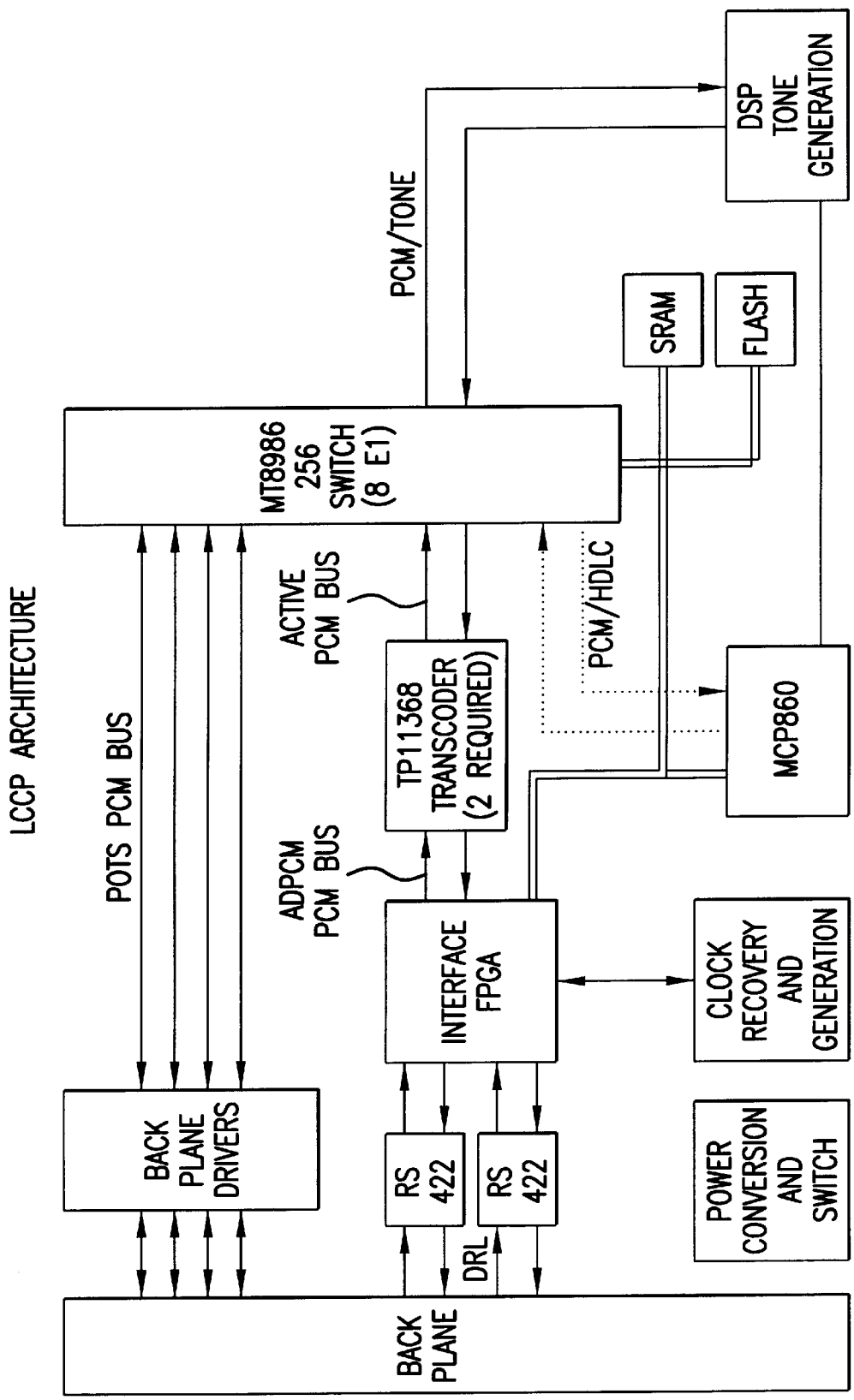
FIG. 18 is a diagram of the link concentration and control processor architecture of the present invention.

A Link Concentration and Control Processor (LCCP) provides the equivalent capability of a combination of the base station controller, ADM, and Feeder cards. (RS-232 Craft Port I/F). FIG. 18 illustrates the architecture of this card. One or two DRL links are terminated into the interface FPGA. Timing and frame alignment of the DRL(s) is recovered and ADPCM traffic fields are multiplexed into a single E1 PCM bus for ADPCM Transcoding. After transcoding, 4,8,12, or 16 PCM channels are provided on a single E1 port to the MITEL switch fabric. The switch fabric provides the Add Drop Mux function for the active PCM channels or busy/idle DSP tones. The resulting 4 E1's are provided to the system via the POTS PCM bus.

An MCP860 processor provides all the call concentration and switch fabric programming functions based on incoming call messages over the DRL byte data interface or from off hook indications from POTS cards.

The preferred method for messaging and control is via a separate E1 an HDLC channel for each POTS card embedded in each time slot. This provides a very flexible interface to meet POTS and other services. This control architecture mimics the Subscriber TDM control channels in the base station architecture A variation on this architecture would essentially be a small scale version of the WLL basestation. The architecture would require an LCCP, a power supply, and one or more advanced POTS cards. The cards would conform the 220 mm depth 6 u form factor used in the base station. The shelf consists of 8 or 12 slots to support 32 to 64 Lines. An additional 32 to 64 lines would be supported in a second shelf with the LCCP slot being depopulated.

POTS cards are supported to include ISDN (prevalent in the international market), transparent data (N×64K), and Virtual LAN/frame relay service. The improvement on the architecture is based on a flexible message based protocol that can be easily expanded to meet future service needs.

Figure 19:
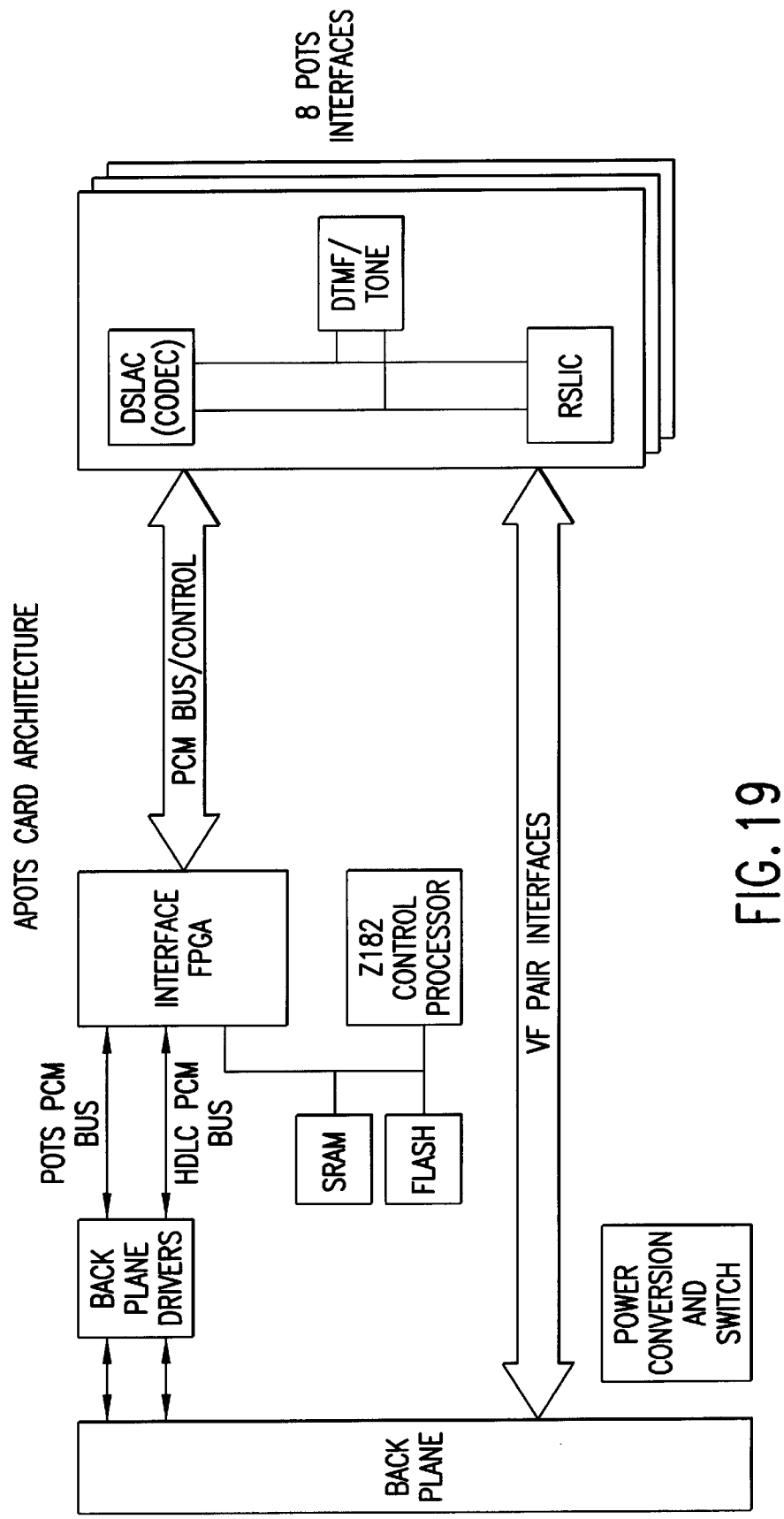
FIG. 19 is a diagram of the APOTS architecture of the present invention.

An advanced POTS (APOTS) card architecture is provided. Ringing SLIC technology eliminates the need for a costly and failure prone RGU (ring generator unit). AMD has introduced the advanced DSLAC. This CODEC/Filter has software programmable trans-hybrid balance, gain, and impedance. No manufacturing line interface variants are required for drive and line impedance at the NT1 customer interface. FIG. 19 illustrates the APOTS card architecture based on an 8-channel card format. The phased ringing in each of the POTS cards will greatly reduces the peak power supply output requirements.

Figure 20:
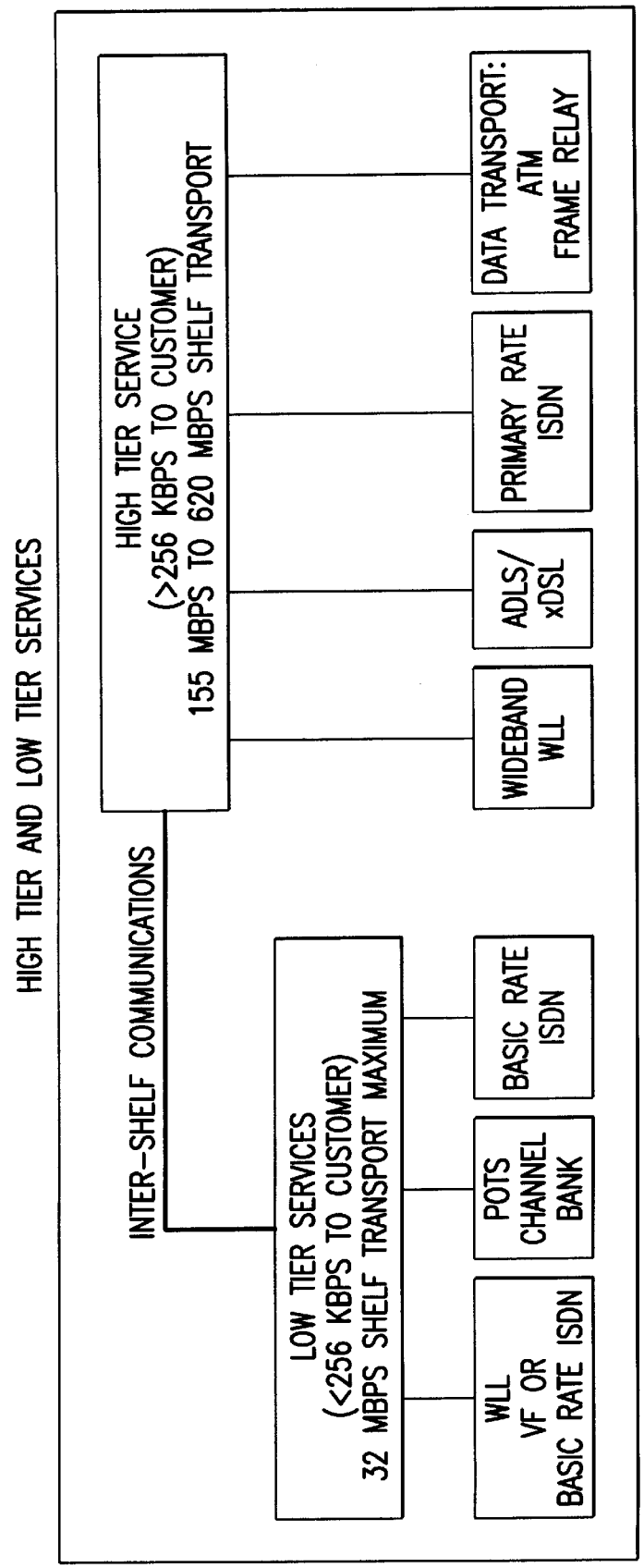
FIG. 20 is a diagram illustrating low tier and high tier services according to the present invention.
Figure 21:
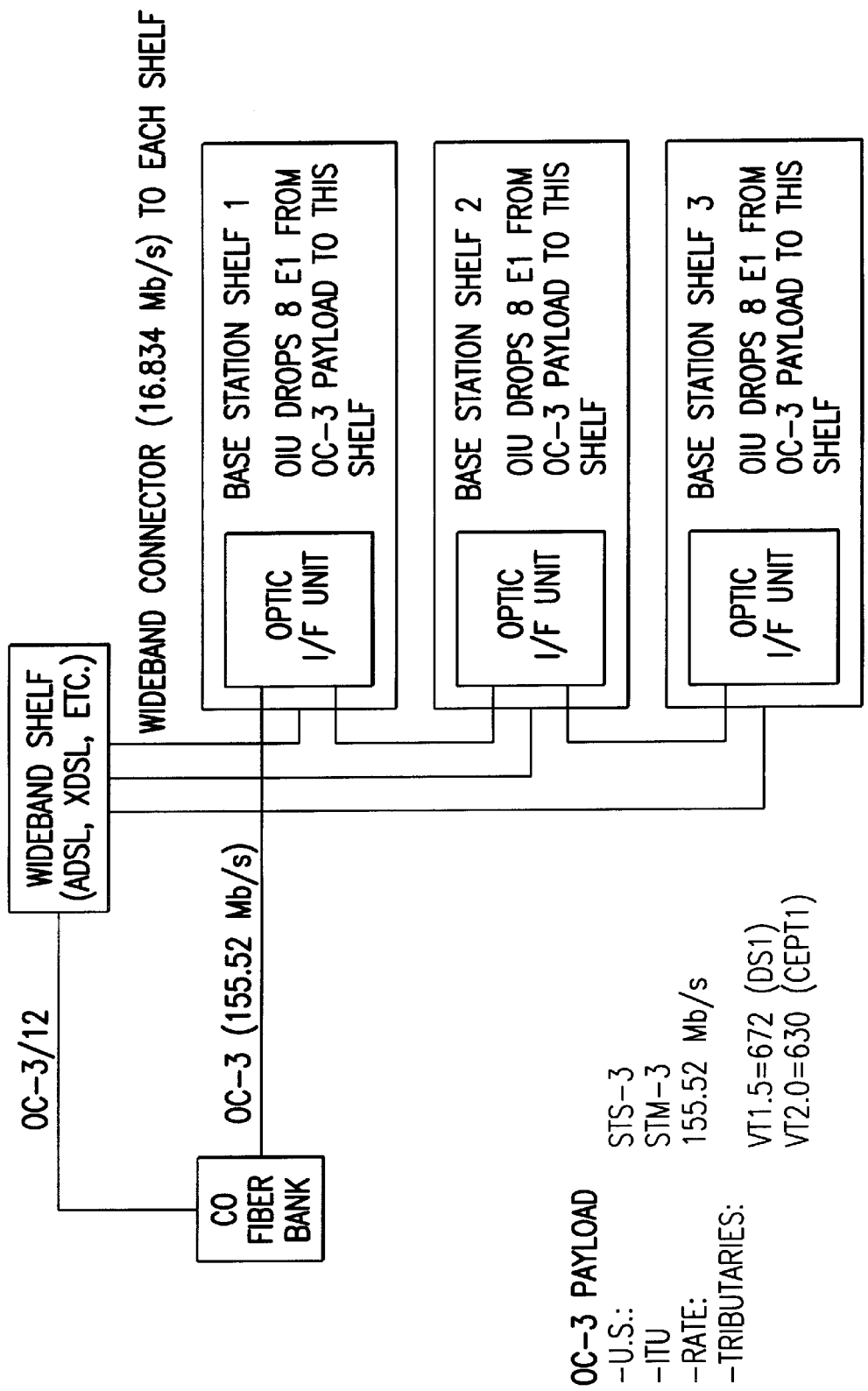
FIG. 21 is a diagram illustrating two tier architecture according to the present invention.

WLL is a low tier communication service providing less than 256 KBPS to the customer premise. FIGS. 20 and 21 illustrates typical high and low tier interfaces. The shelf and inter-shelf communications required to support this interface are below operation rates (32 MBPS). High tier access systems such as ADSL channel banks and Primary Rate ISDN banks are also supported by the present invention. High tier functions provide >256 KBPS access to the customer premise and typically provide multiple MBPS interfaces. To support traffic density levels requires STM-3 (155 MBPS) and STM-12 (620 MBPS) interfaces.

The present invention provides the convenience of various self-test features. The base station provides the following loop-back and self test features: E1/T1 loop back; Wideband TDM bus loop back; Subscriber TDM BUS loop back; Loop back of traffic and messaging in the MODEM ASIC termination; Loop back of CDMA burst at the modem; Loop back of TX composite I/Q to RX I/Q baseband bus (A/D and DAC bypass); End to end loop back with the subscriber unit at RU and at CPI; and Optional JTAG board level boundary scan.

In order to be used in the USA as well as internationally, the base station meets or exceed the following compliance standards: Bellcore GR1089, EMC and Environmental; EN60950, Safety; EN41003, Safety; ETS 300-019, Environmental; IEC 801-4, RFI; EN 55022 Class B EMC; EN 55024 EMC; and K17, K20, K21, lightning protection and power cross.

It should be appreciated by those skilled in the art that the specific embodiments disclosed above may be readily utilized as a basis for modifying or designing other WLL systems for carrying out the same purposes of the present invention. For example, the coding, compression, concentration and modulation schemes may be changed as requirements necessitate. Similarly frame and bus structures may be changed to meet certain specialized needs. It should also be appreciated by those skilled in the art that such equivalent constructions do not depart from the spirit and scope of the invention as set forth in the appended claims.

What is claimed is:

1. A remote base station architecture for wireless transmission of data, voice, video and/or multimedia information comprising:

one or more first buses having a plurality of telecommunication channels;

one or more second buses having a plurality of telecommunication channels, the number of channels in the second bus being less than the number of channels in the first bus;

a front end having one or more switches capable of mapping traffic from the first bus to the second bus;

a remote end having one or more modems for modulating traffic on the second bus for wireless transmission to a subscriber and for demodulating a wireless transmission from a subscriber onto the second bus;

a communication link between the front end of the base station and the remote end of the base station;

the second bus carrying traffic between the switches and the modems via the communication link, the second bus including at least one control channel through which the front end directly controls the one or more modems at the remote end.

2. A base station as in claim 1 wherein the communication link includes a first communication link modem in the front end and a second communication link modem in the remote end.

3. A base station as in claim 1, wherein the communication link includes a microwave back haul.

4. A base station as in claim 1, wherein the communication link includes is a HDL driven copper.

5. A base station as in claim 1, wherein the communication link includes a fiber optic connection.

6. A base station as in claim 1, wherein the communication link includes a satellite uplink and downlink.

7. A base station as in claim 1 wherein the one or more switches are capable of compressing voice and data.

8. A base station as in claim 1 further comprising a third bus including a plurality of network communication links interfacing with a telecommunication network.

9. A base station as in claim 8 further comprising a feeder for multiplexing the third bus onto one or more of the first buses.

10. A base station as in claim 1 wherein the one or more modems comprise one or more modem arrays.

11. A base station as in claim 1 further comprising an IF unit.

12. A base station as in claim 1 further comprising an RF unit.

13. An integrated base station architecture for wireless transmission of data, voice, video and/or multimedia information comprising:
- one or more first buses having a plurality of telecommunication channels;
- one or more second buses having a plurality of telecommunication channels, the number of channels in the second bus being less than the number of channels in the first bus;
- one or more switches capable of mapping traffic from the first bus to the second bus;
- one or more modems for modulating traffic on the second bus for wireless transmission to a subscriber and for demodulating a wireless transmission from a subscriber onto the second bus;
- the second bus providing a continuous connection between the switches and the modems, the second bus including at least one control channel through which the modems are controlled.

14. An integrated base station as in claim 13 further comprising a third bus having a plurality of communication links interfacing with a telecommunications network.

15. An integrated base station as in claim 14 further comprising a feeder for multiplexing the third bus onto one or more of the first buses.

16. An integrated base station as in claim 13 wherein the one or more switches are capable of compressing voice and data.

17. An integrated base station as in claim 13 wherein the one or more modems comprise one or more modem arrays.

18. An integrated base station as in claim 13 further comprising an IF unit.

19. An integrated base station as in claim 13 further comprising an RF unit.

20. A base station for transmission of data, voice, video and/or multimedia information comprising:
- a plurality of shelves including
  - a first bus having a plurality of telecommunication channels;
  - a second bus having a plurality of telecommunication channels, the number of channels in the second bus being less than the number of channels in the first bus;
  - a front end having one or more switches capable of mapping traffic from the first bus to the second bus;
  - a back end for sending traffic received on the second bus from the front end to a subscriber and for receiving a transmission form a subscriber and sending traffic to the front end on the second bus, the back end including a modem controlled by the front end over a channel on the second bus;
  - a back plane for connecting shelf-to-shelf interconnection and for routing of the buses; and
- an antenna.

21. A base station as in claim 20 wherein the back end is capable of providing wired access to subscribers.

22. A base station as in claim 21 wherein the back end includes a POTS channel bank.

23. A base station as in claim 21 wherein the back end includes a digital loop carrier.

24. A base station as in claim 20 wherein the one or more modems comprise one or more modem arrays.

25. A base station as in claim 20 wherein the back end includes an IF unit.

26. A base station as in claim 20 wherein the back end includes an RF unit.

27. A base station as in claim 20 wherein the front end of the base station is in a first location, the back end of the base station is in a second location, different from the first location.

28. A base station as in claim 27 wherein the back end is capable of providing wired access to subscribers.

29. A base station as in claim 28 wherein the back end includes a POTS channel bank.

30. A base station as in claim 28 wherein the back end includes a digital loop carrier.

31. A base station as in claim 27 wherein the back end includes one or more modems for modulating traffic on the second bus for wireless transmission to a subscriber and for demodulating a wireless transmission from a subscriber onto the second bus.

32. A base station as in claim 31 wherein the one or more modems comprise one or more modem arrays.

33. A base station as in claim 27 wherein the back end includes an IF unit.

34. A base station as in claim 27 wherein the back end includes an RF unit.

35. A base station as in claim 27, further comprising a communication link between the front end of the base station and the back end of the base station.

36. A base station as in claim 35, wherein the communication link is a microwave back haul.

37. A base station as in claim 35, wherein the communication link is HDL driven copper.

38. A base station as in claim 35, wherein the communication link is a fiber optic connection.

39. A base station as in claim 35, wherein the communication link includes a satellite uplink and downlink.

40. A base station as in claim 20 wherein the front end of the base station and the back end of the base station are conterminous.

41. A method for sending data, voice, video and/or multimedia information to a subscriber from a base station comprising:
- receiving telecommunication network traffic over a network interface bus;
- multiplexing the traffic on the network interface bus onto a wideband bus;
- concentrating the traffic on the wideband bus onto a subscriber bus;
- sending the traffic on the subscriber bus over a communication link to a remote end;
- receiving the traffic on the subscriber bus over a communication link to a remote end; and
- modulating traffic on the second bus for wireless transmission to a subscriber;
- controlling a modem in the remote end from a front end over the subscriber bus.

42. A method as in claim 41 further comprising performing voice and data compression.

43. A method for sending data, voice, video and/or multimedia information to a subscriber from a base station comprising:
- receiving telecommunication network traffic over a network interface bus;
- multiplexing the traffic on the network interface bus onto a wideband bus;
- concentrating the traffic on the wideband bus onto a subscriber bus;

sending the traffic on the subscriber bus over a communication link to a remote end;

receiving the traffic on the subscriber bus over a communication link to a remote end; and sending traffic on the second bus to a subscriber over a wired network;

controlling a modem in the remote end from a front end over the subscriber bus.

44. A method as in claim 43 further comprising performing voice and data compression.

* * * * *